(12) United States Patent
Mushynski et al.

(10) Patent No.: US 10,689,213 B2
(45) Date of Patent: Jun. 23, 2020

(54) VEHICLE RESTRAINTS WITH A BARRIER HAVING ROTATIONAL AND TRANSLATIONAL MOTION

(71) Applicant: Rite-Hite Holding Corporation, Milwaukee, WI (US)

(72) Inventors: Alan Mushynski, Brookfield, WI (US); Leonard Kikstra, Jackson, WI (US); Matthew Sveum, Wauwatosa, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 15/991,790

(22) Filed: May 29, 2018

(65) Prior Publication Data
US 2019/0367300 A1 Dec. 5, 2019

(51) Int. Cl.
*B65G 69/00* (2006.01)
(52) U.S. Cl.
CPC .......... *B65G 69/003* (2013.01); *B65G 69/006* (2013.01)
(58) Field of Classification Search
CPC .......................... B65G 69/003; B65G 69/006
See application file for complete search history.

(56) References Cited

U.S. PATENT DOCUMENTS

| | | | |
|---|---|---|---|
| 4,472,099 A | 9/1984 | Hahn et al. | |
| 4,815,918 A | 3/1989 | Bennett et al. | |
| 5,071,306 A * | 12/1991 | Alexander | B65G 69/003 14/71.5 |
| 9,174,811 B2 * | 11/2015 | Proffitt | B65G 69/003 |
| 10,377,586 B2 * | 8/2019 | Yule | B65G 69/003 |
| 2008/0095598 A1 | 4/2008 | Cotton et al. | |
| 2010/0260585 A1 | 10/2010 | Sander | |
| 2013/0017044 A1 | 1/2013 | Brooks et al. | |
| 2014/0064892 A1 | 3/2014 | Proffitt et al. | |

FOREIGN PATENT DOCUMENTS

EP 0356073 2/1990

OTHER PUBLICATIONS

International Searching Authority, "International Search Report," issued in connection with International Patent Application No. PCT/US2019/034404, dated Sep. 3, 2019, 7 pages.
International Searching Authority, "Written Opinion," issued in connection with International Patent Application No. PCT/US2019/034404, dated Sep. 3, 2019, 8 pages.

* cited by examiner

*Primary Examiner* — Mark C Hageman
(74) *Attorney, Agent, or Firm* — Hanley, Flight & Zimmerman, LLC

(57) ABSTRACT

Various example vehicle restraints for use at a loading dock for blocking and later releasing a vehicle's rear impact guard. In some examples, the vehicle restraint includes a hook-shaped barrier that rotates between a lowered position and a raised position. The barrier rotates up to block the rear impact guard and rotates down to release it. The barrier also translates or shifts forward and back between a retracted position and an extended position. The barrier shifts forward to relieve forward pressure that the vehicle might exert against the barrier just prior to releasing the rear impact guard.

25 Claims, 26 Drawing Sheets

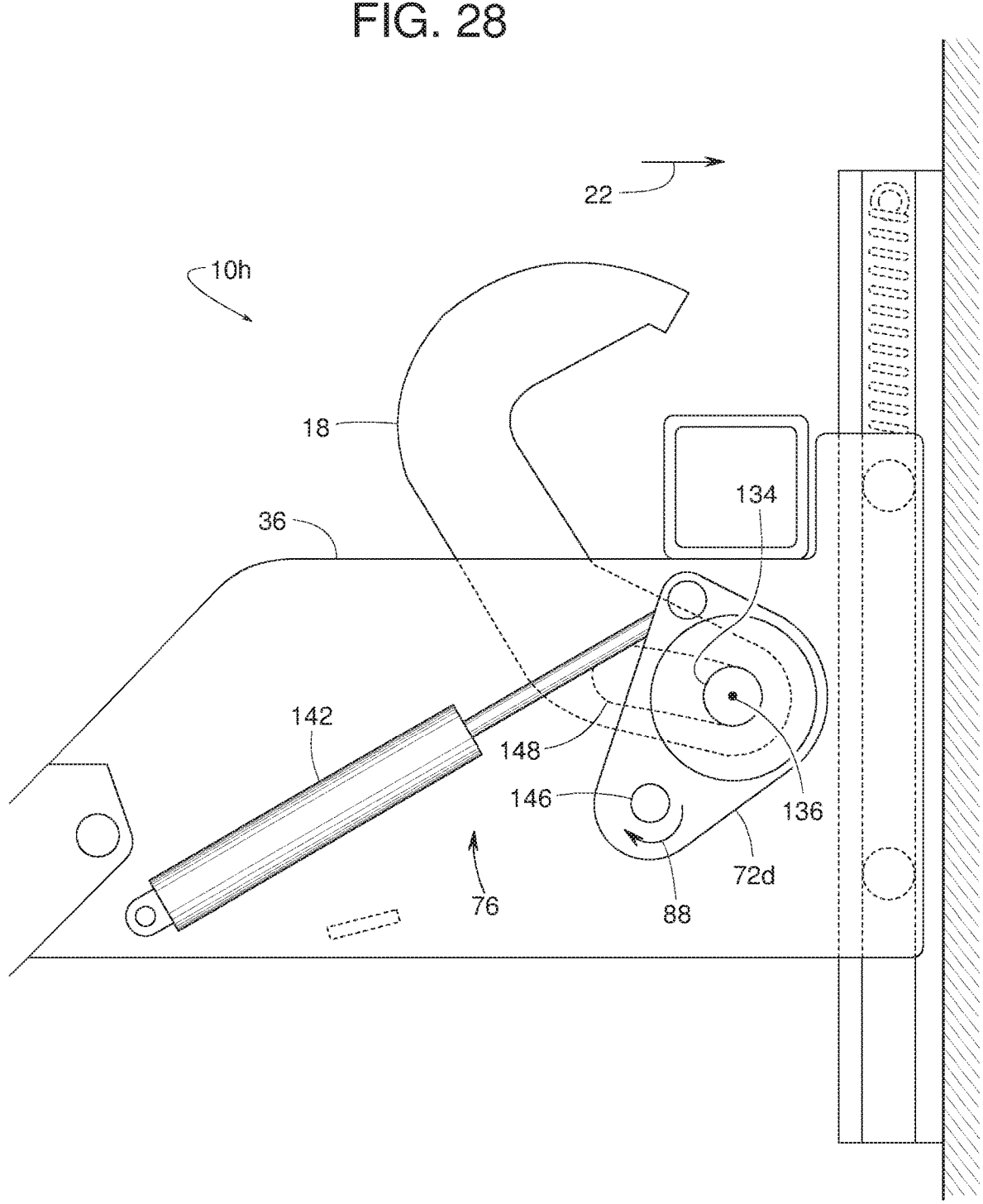

The figures are not necessarily to scale and certain features and certain views of

VEHICLE RESTRAINTS WITH A BARRIER HAVING ROTATIONAL AND TRANSLATIONAL MOTION

FIELD OF THE DISCLOSURE

This disclosure relates generally to vehicle restraints for use at loading docks and more particularly to vehicle restraints with a barrier having rotational and translational motion.

BACKGROUND

When loading or unloading a vehicle (e.g., a truck, trailer, etc.) parked at a loading dock, a hook-style vehicle restraint may be employed to restrain the vehicle and prevent or restrict the vehicle from accidentally moving too far away from the dock during loading and/or unloading operations. To restrain the vehicle, a hook-style vehicle restraint engages what is often referred to in the industry as a vehicle's ICC bar (Interstate Commerce Commission bar) or RIG (Rear Impact Guard). An ICC bar or RIG includes a bar or beam that extends horizontally across the rear of a vehicle, below the bed of the truck or trailer. Its primary purpose is to help prevent an automobile from under-riding the vehicle in a rear-end collision. A RIG, however, also provides a structure for a hook-style restraint to extend around in order to obstruct movement of the bar and thereby the vehicle away from the dock during loading and unloading operations.

To release the vehicle and allow it to drive away from the dock, the restraint is moved to a position in which it does not obstruct the movement of the bar. Sometimes, however, forward pressure from the vehicle (away from the dock) causes the restraint's hook to catch on the bar in a way that prevents the hook from disengaging the ICC bar. Such a condition is remedied by what's known as a "bump-back," where the vehicle backs up slightly toward the dock to release the pressure on the restraint and thus allow the hook to disengage from the ICC bar. Once the hook is no longer obstructing the vehicle's movement, the vehicle is free to drive away from the dock.

BRIEF DESCRIPTION OF THE DRAWINGS

FIG. 4 shows the rear impact guard of the vehicle in engagement with the example vehicle restraint and an example barrier of the example vehicle restraint in a stored position.

FIG. 28 is a side view similar to FIG. 7 but showing the example vehicle restraint of FIG. 25.

Figure 1:
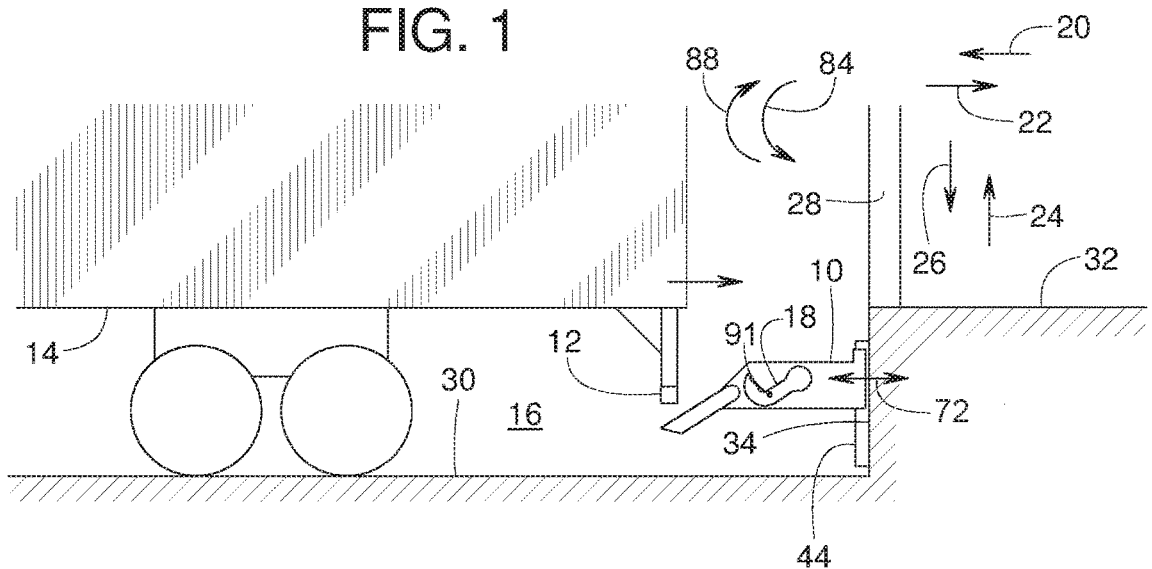
FIG. 1 is a side view of an example vehicle backing into an example dock that includes an example vehicle restraint system shown in a stored position.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. Additionally, several examples have been described throughout this specification. Any features from any example can be included with, a replacement for, or otherwise combined with other features from other examples. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

Various example vehicle restraints for use at a loading dock for blocking and releasing a rear impact guard of a vehicle are disclosed. Example vehicle restraints disclosed herein include a hook-shaped barrier that rotates between a lowered position (e.g., a stored position) and a raised position (e.g., a deployed position). For example, example barriers disclosed herein can rotate upward to the raised position and rotate downward to the stored position. In the raised position, the example barriers disclosed herein block, restrict or prevent forward movement of a vehicle in a direction away from a forward-facing wall (e.g., a dock face) of a loading dock.

Example barriers disclosed herein also translate or shift forward and back (e.g., horizontally or laterally relative to a rear impact guard) to enable the barrier to restrain (e.g., capture) and/or release the rear impact guard. For example, in the raised position, example barriers disclosed herein are positionable along a moving path of the rear impact guard. In some examples, after the example barrier is rotated from the stored position to the raised position, the example barrier disclosed herein translates or moves (e.g., laterally while the barrier is in the raised position) from a blocking position to a capturing position (e.g., toward the rear impact guard to directly engage the rear impact guard). In a first blocking position with the barrier in the raised position, example barriers disclosed herein may not be in direct contact with the rear impact guard. In a second blocking position (e.g., a capturing position) with the barrier in the raised position, example barriers disclosed herein may be in direct contact with the rear impact guard. In some examples, example barriers disclosed herein rotate to the upward (e.g. blocking position) prior to the barrier translating in a lateral direction (e.g., a horizontal direction) between the blocking position and the capturing position. In some examples, example barriers disclosed herein may be locked in the rotational position when the barriers are in the first blocking position and/or prior to translating the barrier to the second blocking position or capturing position.

To release the vehicle from the vehicle restraint, example barriers disclosed herein may move laterally in a direction away from the rear impact guard of the vehicle to disengage the rear impact guard. In some examples, the barrier shifts laterally (e.g., horizontally) in a forward direction (e.g., away from a forward-facing wall of a dock) to relieve forward pressure that a vehicle might exert against the barrier just prior to the barrier releasing the rear impact guard. After the barrier is laterally moved (e.g., to relieve forward pressure or to the first blocking position), the example barrier may be rotated from the raised position to the stored position. In some examples, a drive unit disclosed herein may cause the barrier to rotate between the stored and raised positions and cause the barrier to translate between the first and second blocking positions. In some examples, a first drive unit (e.g., a motor) may be employed to rotate the barrier between the stored and raised positions and a second drive unit (e.g., a powered actuator) different from the first drive unit may be employed to translate the barrier between the first and second blocking positions.

Figure 2:
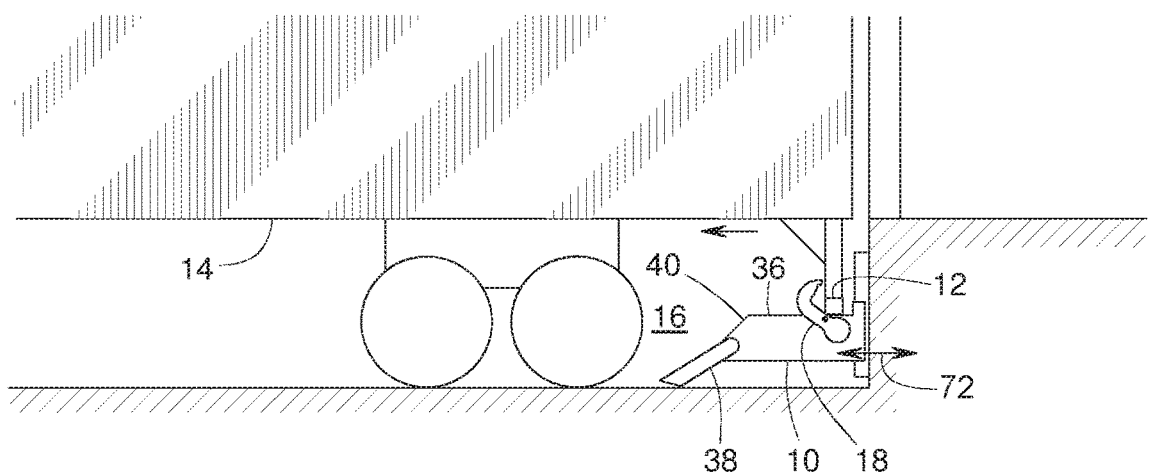
FIG. 2 is a side view similar to FIG. 1 but showing the example vehicle restraint system in a first deployed position to capture a rear impact guard of the vehicle.
Figure 3:
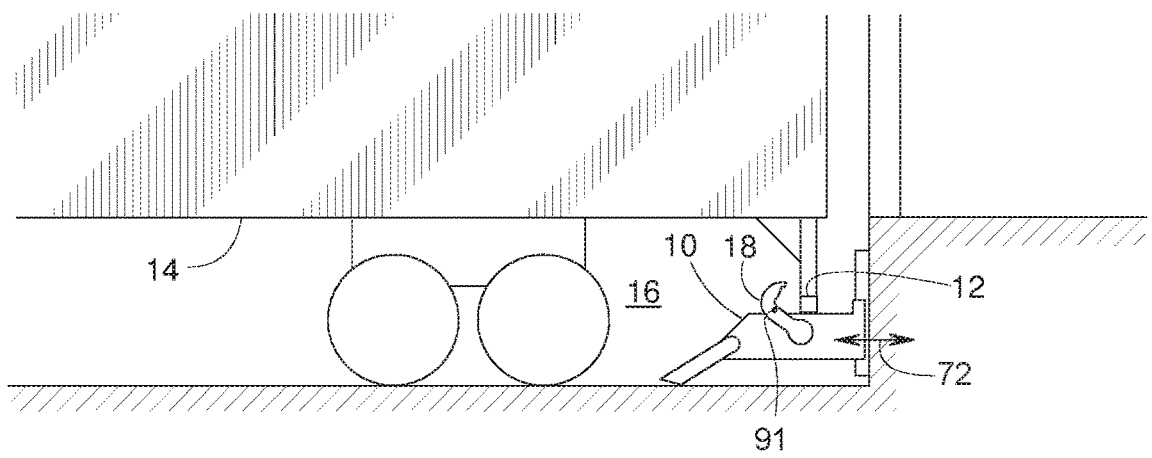
FIG. 3 is a side view similar to FIG. 2 but showing the example vehicle having moved slightly forward and showing the example vehicle restraint system in a second deployed position to block the rear impact guard of the vehicle.

FIGS. 1-3 illustrate an example vehicle restraint 10 for blocking and releasing a rear impact guard 12 of a vehicle 14 (e.g., a truck, a trailer, etc.) at a loading dock 16. For spatial reference in the orientation of FIGS. 1-28, arrow 20 represents a forward direction (e.g., a horizontal direction) away from/out of the loading dock 16, arrow 22 represents a rearward direction (e.g., a horizontal direction) toward/into the loading dock 16, arrow 24 represents an upward direction (e.g., a vertical direction), arrow 26 represents a downward direction (e.g., a vertical direction), arrow 88 represents a clockwise rotational direction, and arrow 84 represents a counterclockwise rotational direction.

FIG. 1 shows the vehicle 14 backing into the loading dock 16. In some examples, the loading dock 16 includes a doorway 28, a driveway 30, a platform 32, and a forward-facing wall 34 (e.g., a dock face) extending between the platform 32 and the driveway 30. The vehicle restraint 10 is secured to the forward-facing wall 34. FIG. 2 shows the rear impact guard 12 of the vehicle 14 engaged with (e.g., resting atop) a carriage frame 36 of the vehicle restraint 10 after the vehicle 14 moved rearward causing the rear impact guard 12 to move (e.g., slide back) along a lead-in guide 38 (e.g., a pivotal lead-in guide) and an inclined edge 40 of the carriage frame 36. In some examples, the carriage frame 36 is spring biased upward to the position shown in FIG. 1. In opposition to the upward spring force, the rear impact guard 12 sliding back along the lead-in guide 38 and the inclined edge 40 pushes the carriage frame 36 down along a main track 44 mounted at a fixed position relative to the loading dock 16.

The vehicle restraint 10 of the illustrated example includes a barrier 18 (e.g., a hook-shaped barrier) to block, restrain, and/or otherwise capture the rear impact guard 12 when the rear impact guard 12 is positioned on the carriage frame 36 (e.g., and sufficiently close to the forward-facing wall 34). The barrier 18 rotates (e.g., selectively) between a stored position (e.g., a retracted position) (FIG. 1) and a raised position (FIGS. 2 and 3). The barrier 18 of the illustrated example rotates in the clockwise direction 88 from the stored position to the raised position and rotates in the counterclockwise direction 84 from the raised position to the stored position. To move the barrier 18 in the clockwise direction 88 from the stored position to the raised position and in the counterclockwise direction 84 from the raised position to the stored position, the vehicle restraint 10 of the illustrated example employs a drive unit 72. When the rear impact guard 12 is in engagement with (e.g., squarely on top of) the carriage frame 36, the drive unit 72 rotates the barrier 18 upward in the clockwise direction 88 from the stored position of FIG. 1 to the raised position of FIG. 3, causing the barrier 18 to protrude from (e.g., an upper surface of) the carriage frame 36. In the raised position, the barrier 18 may not be in direct contact with the rear impact guard 12. However, as noted above, the vehicle restraint 10 (e.g., and the barrier 18) is in a blocking position. For example, in the raised position the barrier 18 may be spaced from the rear impact guard, but is positioned in a travel path of the rear impact guard 12. Thus, in the blocking position, the barrier 18 is in the raised position (e.g., a fully raised or extended position), but can be spaced from the rear impact guard 12. The drive unit 72 rotates the barrier 18 downward in the counterclockwise direction 84 from the raised (i.e., blocking) position to the stored position to enable the rear impact guard 12 to move in a forward direction 20 along the edge 40 of the carriage 36.

To engage or capture the rear impact guard 12 of the vehicle 14, the barrier 18 of the illustrated example translates or shifts (e.g., horizontally) between the blocking position (e.g., FIG. 3) and a cinching or capturing position (e.g., FIG. 2). To move the barrier 18 in direct engagement with the rear impact guard 12, the vehicle restraint 10 of the illustrated example employs the drive unit 72. The drive unit 72 of the illustrated example moves (e.g., laterally shifts) the barrier 18 between the forward direction 20 away from/out of the loading dock 16 (e.g., away from the forward-facing wall 34) and the rearward direction 22 toward/into the loading dock 16 (e.g., toward the forward-facing wall 34). For example, the drive unit 72 moves (e.g., laterally shifts) the barrier 18 to the capturing position to directly engage the rear impact guard 12 as shown, for example, in FIG. 2. In the capturing position, the barrier 18 prevents or restricts lateral movement of the rear impact guard 12 relative to the forward-facing wall 34. The vehicle restraint 10 of the illustrated example includes one or more sensors 91 to determine that the barrier 18 is properly positioned relative to (e.g., engaged with) the rear impact guard 12. In the illustrated example, the sensor 91 is positioned on the barrier 18. Alternatively or in addition, one or more sensors may be positioned on the carriage frame 36, another part of the restraint 10, and/or elsewhere in the loading dock 16. In some examples, the sensors 91 may include, for example, an encoder (e.g., an angular or rotary encoder), an ultrasonic sensor, a laser sensor, and/or any other type of sensor(s). For example, an encoder can be employed to detect an angular position of the barrier 18 relative to a reference (e.g., an upper most blocking position, a stored position, etc.). In some examples, an ultrasonic sensor and/or a laser sensor may be employed to detect a distance (e.g., a horizontal distance) of the barrier 18 relative to the RIG 12. In some examples, the sensors 91 can be coupled to the barrier 18, the carriage frame 36, a dock face of the loading dock, and/or any other structure of the vehicle restraint 10 and/or the loading dock.

To release forward pressure from the vehicle 14 that may be imparted to the barrier 18, the drive unit 72 causes the barrier 18 to move or shift laterally in a forward direction 20 away from the rear impact guard 12 as shown, for example, in FIG. 3. After the barrier 18 is laterally moved to remove forward pressure from the vehicle 14, the barrier 18 rotates from the raised position to the stored position (e.g., as shown in FIG. 1). In some examples, if the vehicle 14 later attempts to move forward or experiences net forces in the forward direction, the rear impact guard 12 might force or move (e.g., translate) the barrier 18 laterally from the capturing position (FIG. 2) to the blocking position (FIG. 3), where the barrier 18 still effectively blocks the rear impact guard 12 from disengagement with the vehicle restraint 10 and unrestrained movement away from the forward-facing wall 34.

The drive unit 72 may be, for example, a drive unit 72a in the form of a rack-and-pinion assembly (FIGS. 4-8), a drive unit 72b in the form of a powered chain-and-sprocket assembly (FIG. 9), a powered leadscrew, an electric motor, a linear motor, a hydraulic cylinder, a drive unit 72c in the form of a powered pivotal arm 73 (FIG. 21-24), a drive unit 72d in the form of a powered pivotal arm 143 (FIGS. 25-28) and/or any combinations thereof. For example, in some examples, the drive unit 72 may be a linear actuator that causes the barrier 18 to move between a raised position and a stored position in response to a change in length of the linear actuator.

In some examples, the drive unit 72 causes the barrier 18 to rotate between the stored position and the raised position and causes the barrier 18 to translate between the blocking position and the capturing position. To this end, the barrier 18 rotates between a fully raised position and a fully stored position as the drive unit 72 translates the barrier 18 in the forward direction 20 and the rearward direction 22 (e.g., between the blocking position and the capturing position). In some examples, a motor (e.g., a first drive unit) causes rotational movement of the barrier 18 between the stored position and the raised position and the drive unit 72 (e.g., a second drive unit) causes the barrier 18 to translate in the forward direction 20 and the rearward direction 22 (e.g., between the blocking position and the capturing position). In some examples, the barrier 18 moves (e.g., rotates) between the stored position and the raised position prior to the barrier moving (e.g., translating horizontally) between the blocking position and the capturing position. To this end, the barrier 18 rotates to the fully raised position prior to the barrier 18 shifting laterally to restrain or capture the rear impact guard 12 of the vehicle 14.

FIGS. 4-28 show various example vehicle restraints 10a-10h that may implement the vehicle restraint 10 of FIGS. 1-3. Many of the components of FIGS. 4-28 are substantially similar or identical to the components described above in connection with FIGS. 1-3. As such, those components will not be described in detail again below. Instead, the interested reader is referred to the above corresponding descriptions for a complete written description of the structure and operation of such components. To facilitate this process, similar or identical reference numbers will be used for like structures in FIGS. 4-28 as used in FIGS. 1-3.

FIGS. 4-8 illustrate an example vehicle restraint 10a that may implement the example vehicle restraint 10 of FIGS. 1-3. In the illustrated example, the vehicle restraint 10a includes the main track 44, the carriage frame 36 (including a first panel 36a and a second panel 36b), a main track follower 46 (e.g., rollers, sliding blocks, etc.) that enables the carriage frame 36 to travel along the main track 44, and a bias element 42 (e.g., spring) to urge the carriage frame 36 in the upward direction 24. The vehicle restraint 10a of the illustrated example includes a secondary track 48 (e.g., a slot, a channel, a bar, a groove, a ledge, etc.) formed in or carried on the carriage frame 36. A track follower 50 moves (slides, glides or otherwise travels) in guided relationship along the secondary track 48. For example, the track follower 50 moves (slides, glides or otherwise travels) in guided relationship along a longitudinal length (e.g., in the forward direction 20 and the rearward direction 22) of the secondary track 48 between a first or front end 56 (e.g., a forward end) and a second or rear end 58 (e.g., a rearward end) of the secondary track 48. The term, "guided relationship" refers to one structure or feature guiding the travel of another structure or feature. The track follower 50 of the vehicle restraint 10a of FIGS. 4-8 includes a front roller 52 and a rear roller 54 (e.g., a back roller). In the illustrated example, the front roller 52 and the rear roller 54 are substantially equal in elevation (e.g., in the vertical direction) regardless of whether the barrier 18 is in the raised position, the stored position and/or the capturing position.

In some examples, the vehicle restraint 10a also includes a first shaft 60 coupling the track follower 50 and the front roller 52, and a second shaft 62 coupling the track follower 50 to both the barrier 18 and the rear roller 54 such that the barrier 18 pivots about a pivot 64 (e.g., a pivot axis, a pivot point, etc.) defined by a second shaft 62. Some examples of the vehicle restraint 10a further include a roller 66 (or a plurality of rollers 66) rotatable about an axis 68 that is at a fixed location relative to the carriage frame 36, and a cam surface 70 on the underside of the barrier 18 to engage and/or move along (e.g., glide over) the roller 66.

To rotate the barrier 18 between the stored position and the raised position and/or to slide the barrier 18 laterally to the capturing position, the vehicle restraint 10a of the illustrated example includes a drive unit 72a (e.g., a motor). For example, the drive unit 72a of the illustrated example moves the track follower 50 and the barrier 18 in the forward direction 20 and/or the rearward direction 22 along the secondary track 48. Additionally, as described in greater detail below, movement of the barrier 18 along the secondary track 48 via the track follower 50 causes the barrier 18 to rotate about the pivot 64 between the stored position and the raised position. For example, the barrier 18 rotates between the stored position and the raised position as the track follower 50 moves between the first end 56 of the secondary track 48 and the second end 58 of the secondary track 48. The drive unit 72a of the illustrated example is a powered rack-and-pinion assembly that includes a rack 90, a lower pinion 82 (e.g., a gear, a pinion gear), and upper pinions 86 (e.g., two upper pinions or gears, pinion gears, etc.). The upper pinions 86 enmesh with one or more projections and/or voids (e.g., serrated teeth, saw-tooth shaped teeth, etc.) of the rack 90 of the track follower 50 such that rotation of the upper pinions 86 cause the track follower 50 to translate (e.g., move or slide) along the secondary track 48 between the first end 56 and the second end 58. For example, the drive unit 72a may include a motor (e.g., an electric motor) that rotates the lower pinion 82 in the clockwise direction 88 and the counterclockwise direction 84. Rotation of the lower pinion 82 in the counterclockwise direction 84 causes rotation of the upper pinions 86 in the clockwise direction 88, and vice versa. The drive unit 72a (e.g., the illustrated rack-and-pinion assembly) of the illustrated example includes the upper pinions 86 to enable a greater travel distance of the track follower 50 than would otherwise be possible in alternative examples in which the track follower 50 is driven by just one of the upper pinions 86 engaging the rack 90.

To (e.g., selectively) hold and release the barrier 18 and/or the track follower 50, the vehicle restraint 10a of the illustrated example includes a catch 74. The catch 74 of the illustrated example includes one or more voids and/or projections (e.g., serrated teeth, saw-tooth shaped teeth, etc.). To move the catch 74 between a holding position (e.g., as shown in FIGS. 7 and 11) and a release position (e.g., as shown in FIGS. 4-6, 9 and 10), the vehicle restraint 10a of the illustrated example includes actuator assembly 76. The actuator assembly 76 of the illustrated example includes an actuator 76a (e.g., a hydraulic cylinder, a solenoid, an electric motor, a linear motor, etc.), a mechanism 77 (e.g., a sliding block, a pivotal block, etc.), or some combination thereof (e.g., a powered rack-and-pinion assembly, a powered chain-and-sprocket assembly, a powered leadscrew, a powered pivotal arm, etc.). Thus, the actuator assembly 76 (e.g., the actuator 76a and the mechanism 77) moves the catch 74 in a first direction (e.g., the upward direction 24) into engagement with (e.g., teeth of) the track follower 50 to lock or prevent movement of the barrier relative to the carriage frame 36 and a second direction (e.g., the downward direction 26) to disengage the catch 74 from the track follower 50 to allow movement of the barrier 18 relative to the carriage frame 36. The catch 74 can be an integral portion of the actuator assembly 76 (e.g., the mechanism 77) or a separate component. In some examples, the track follower 50 includes a rack (e.g., a linear gear or gear rack) with projections and/or voids (i.e., teeth) having a shape that provides a greater holding force when engaged with similar voids and/or projections (i.e., teeth) formed in the catch (e.g., such as the track follower 50a and the catch 74a of FIG. 9). Various examples of suitable actuator assemblies and/or catches that may employ the vehicle restraint 10a are described in connection with vehicle restraints 10b-h of FIGS. 9-28. The actuator assembly 76 of the illustrated example is shown outside (e.g., a dimensional envelope) of the carriage frame 36. However, in some examples, the actuator assembly 76 may be positioned within (e.g. a dimensional envelope or inside) of the carriage frame 36. For example, in some such example, the carriage frame 36 may be formed with a width that is greater than shown in the example illustration to accommodate the actuator assembly 76.

Figure 4:
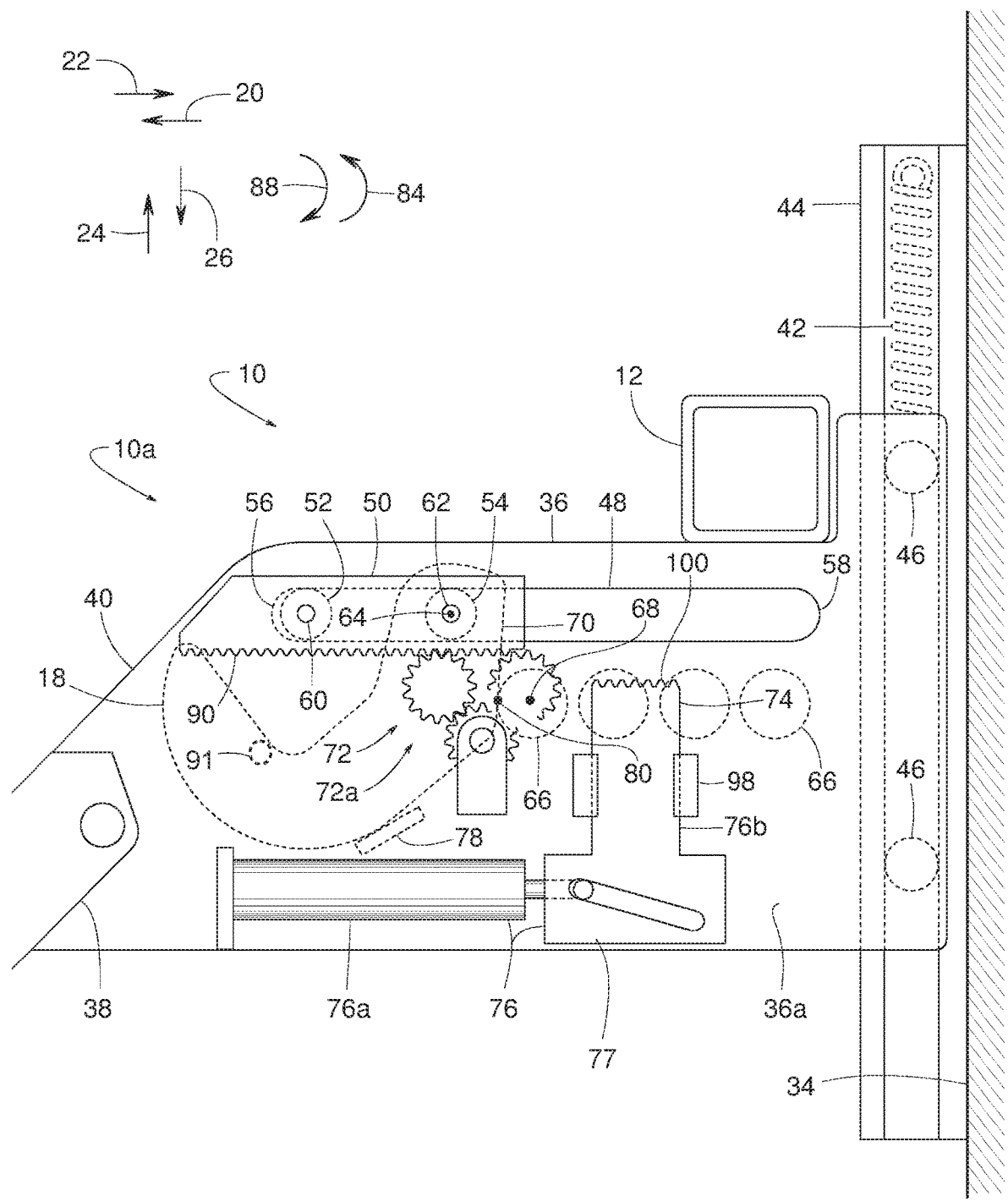
FIG. 4 is a side view similar to FIG. 1 but showing an example vehicle restraint that may implement the example vehicle restraint system of FIGS. 1-3.

An example operating sequence of the vehicle restraint 10a is described with reference to FIGS. 4-7. Referring to FIG. 4, the vehicle 14 is moved rearward such that the rear impact guard 12 is positioned on the carriage frame 36 displacing the carriage frame 36 in the downward direction 26 along the main track 44 while the bias element 42 urges the carriage frame 36 in the upward direction 24 against an underside of the rear impact guard 12. Additionally, the barrier 18 as shown in FIG. 4 is in the stored position (e.g., a fully retracted position). In the retracted position, the barrier 18 is below an upper surface of the carriage frame 36 that the rear impact guard engages when the vehicle 14 moves in the rearward direction 22 toward the forward-facing wall. In some examples, when the barrier 18 is in the stored position, the barrier 18 rests against, engages or otherwise is supported by a lower support bar 78 that extends laterally between the first panel 36a and the second panel 36b, and the cam surface 70 of the barrier 18 engages the roller 66 at a first contact point 80. For example, the cam surface 70 is oriented toward the rearward direction 22 or the forward-facing wall 34 of the loading dock 16 when the barrier 18 is in the stored position. Thus, the barrier 18 rotates between the stored position and the raised position (e.g., a blocking position) when the track follower 50 moves along a first portion of the secondary track 48, and the barrier 18 translates (e.g., from the raised position or the blocking position) to the capturing position (e.g., to engage the rear impact guard 12) when the track follower 50 moves along a second portion of the secondary track 48 different than the first portion. For example, the first portion of the secondary track 48 is between the first end 56 and an intermediate point (e.g., between the first end 56 and the second end 58), and the second portion is between the intermediate point and the second end 58.

Figure 5:
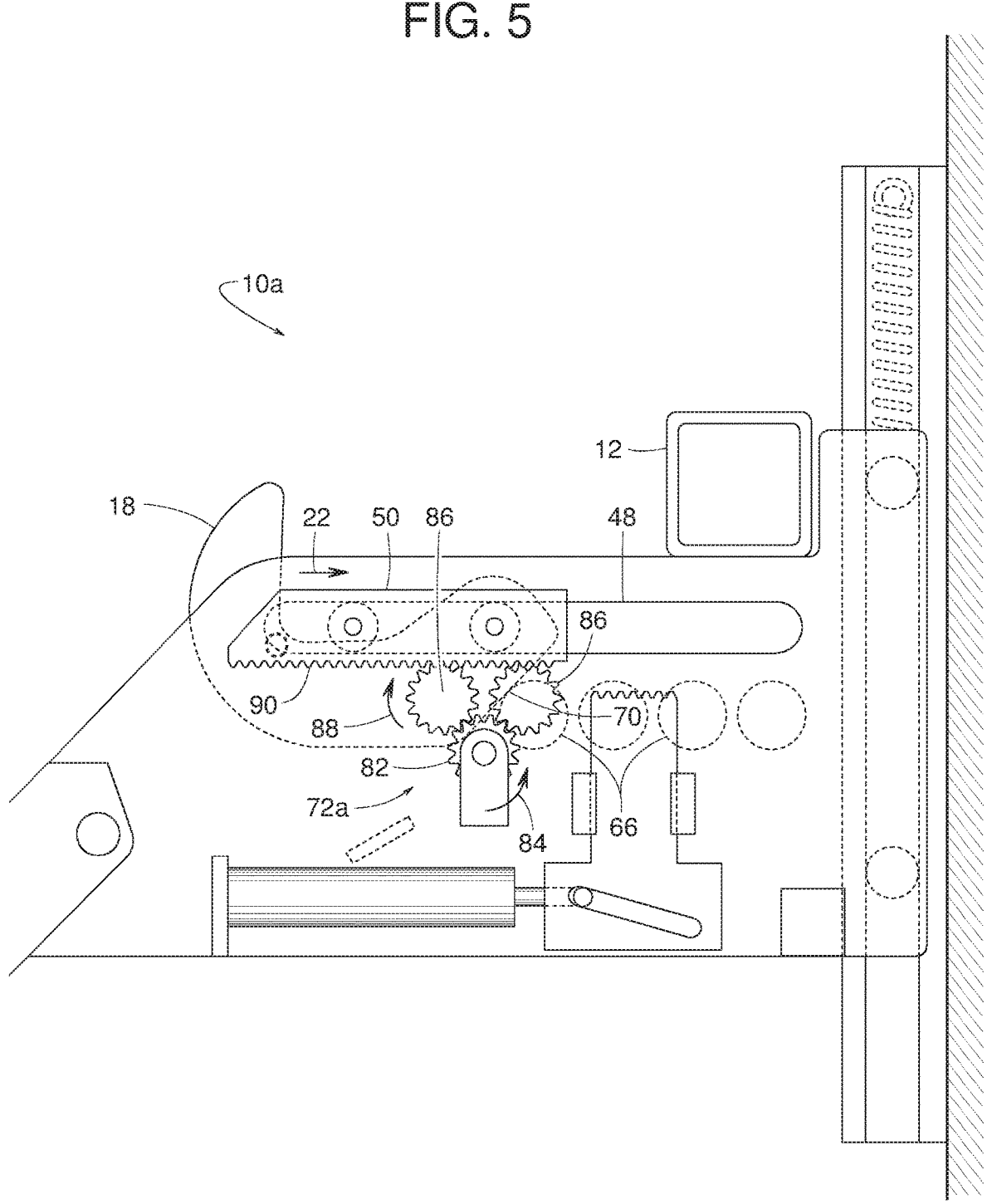
FIG. 5 is a side view similar to FIG. 4 but showing the example barrier at a partially deployed position.

Referring to FIG. 5, the drive unit 72a is activated to begin movement of the barrier 18 from the stored position toward the raised position and into the exit path of the rear impact guard 12. In the illustrated example, the drive unit 72a drives or rotates the pinion 82 in the counterclockwise direction 84, which in turn causes the upper pinions 86 to rotate in the clockwise direction 88. The upper pinions 86 mesh with a rack 90 (e.g., a toothed gear, a toothed rack, a linear gear rack) of the track follower 50. In the illustrated example, rotation of the upper pinions 86 in the clockwise direction 88 causes the track follower 50 to move in the rearward direction 22 along the secondary track 48. Movement of the track follower 50 in the rearward direction 22 when the cam surface 70 is in engagement with the roller 66 at the first contact point 80 causes or forces the barrier 18 to rotate about the pivot 64 in the clockwise direction 88, causing the barrier 18 to rotate to a partially deployed position shown in FIG. 5 (e.g., in the upward direction 24 relative to the carriage frame 36) and extend above the upper surface of the carriage frame 36 (e.g., toward a blocking position).

Figure 6:
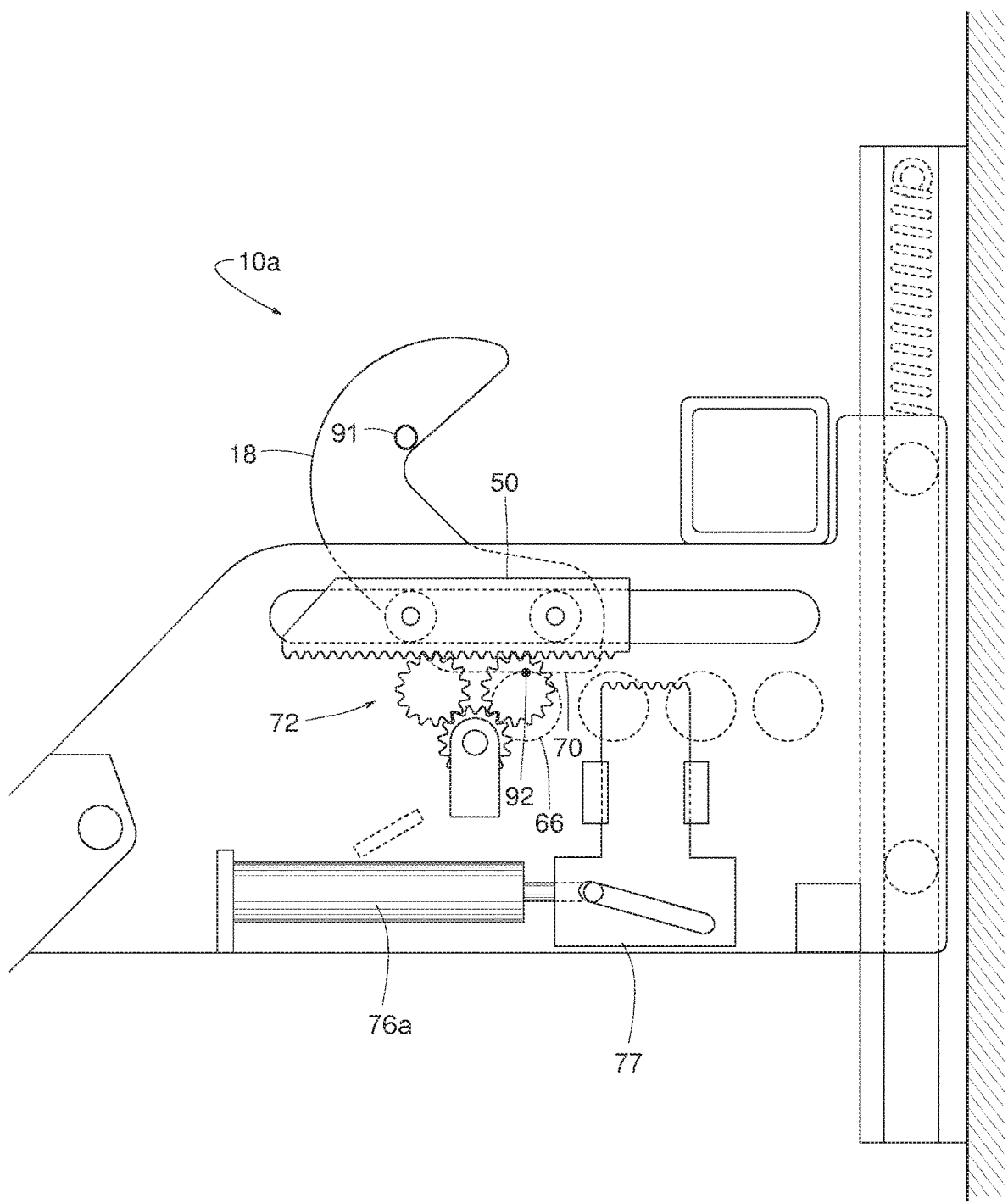
FIG. 6 is a side view similar to FIGS. 4 and 5 but showing the example barrier at a first deployed, blocking position.
Figure 7:
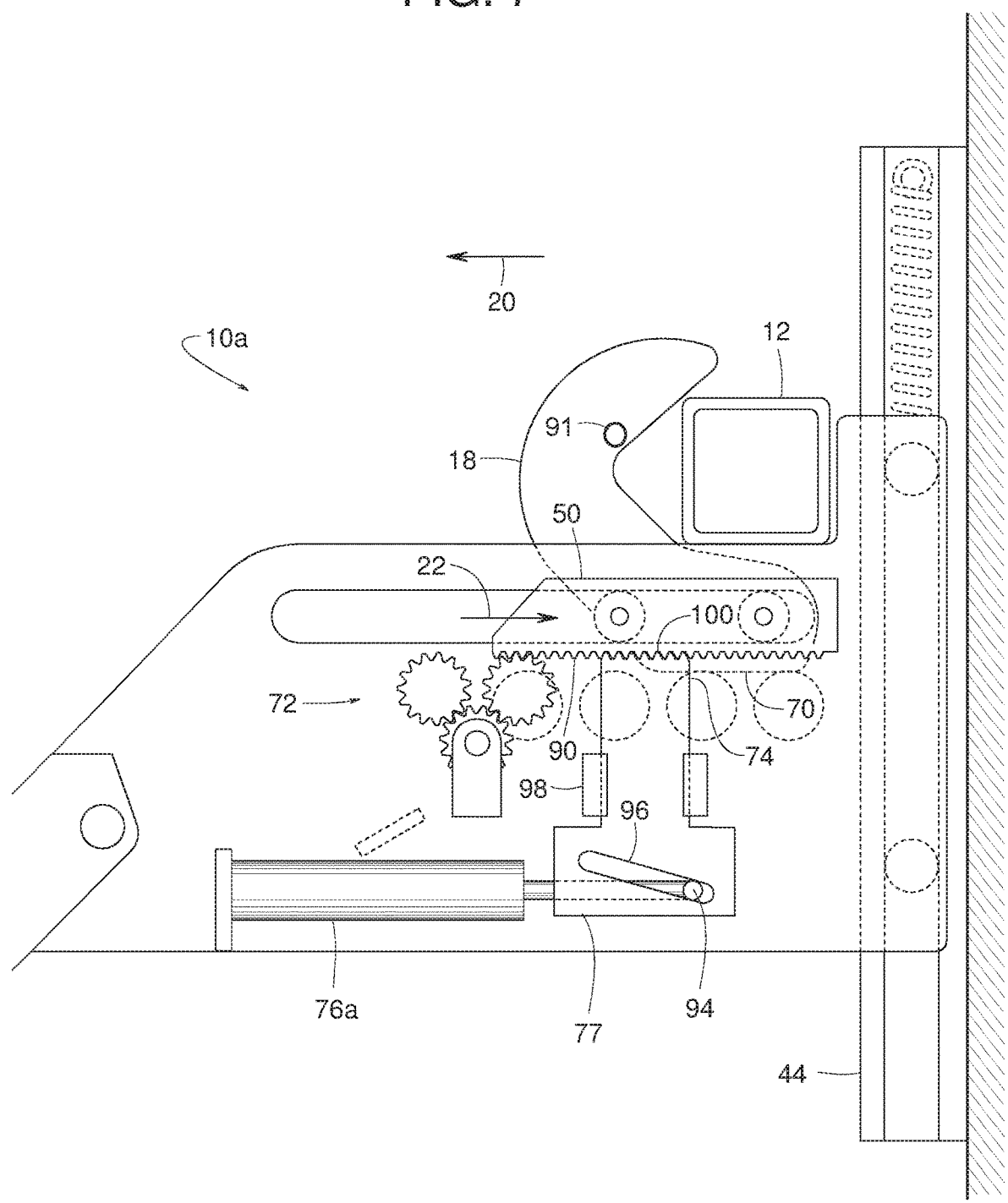
FIG. 7 is a side view similar to FIGS. 4-6 but showing the example barrier at a second deployed, capturing position.
Figure 8:
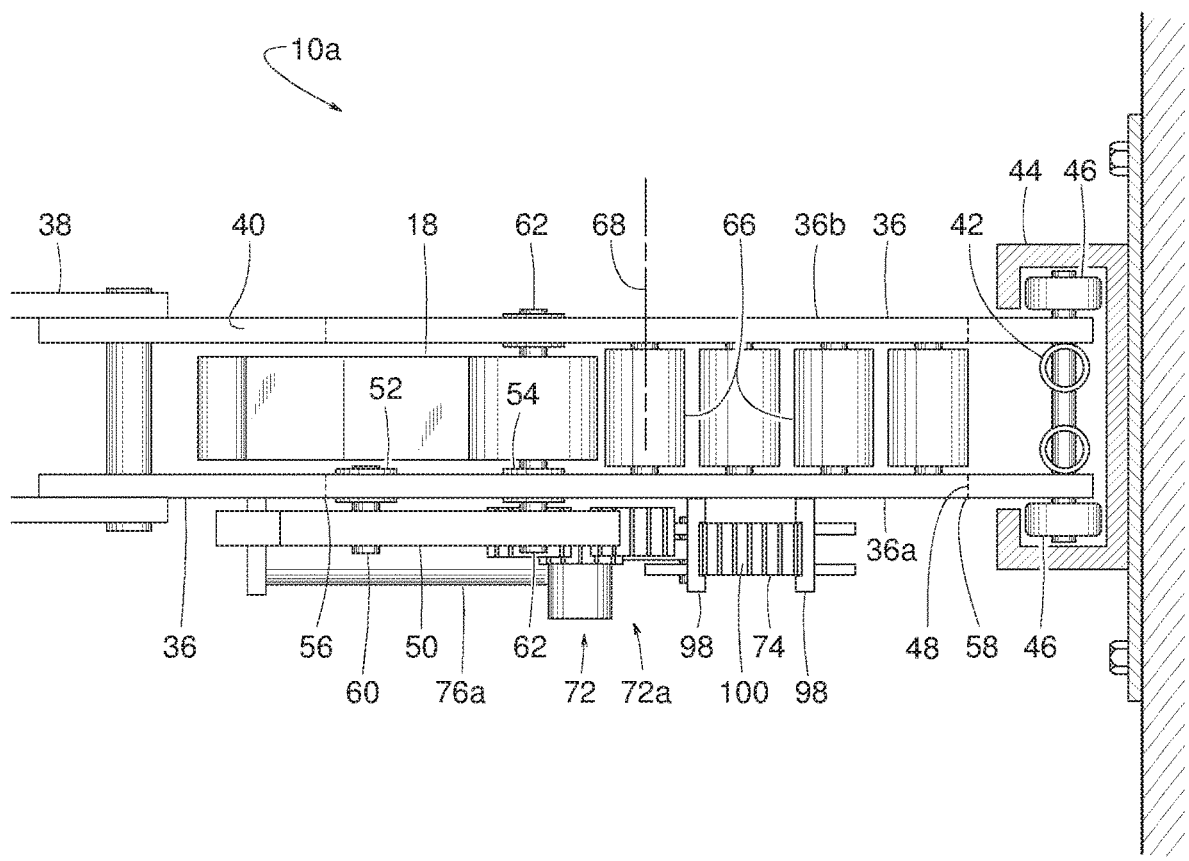
FIG. 8 is a top view of FIG. 4, but with the example rear impact guard omitted for clarity.

FIG. 6 shows the drive unit 72a having moved the cam surface 70 of the barrier 18 on top of the roller 66 such that the cam surface 70 engages the roller 66 at a second contact point 92. For example, the cam surface 70 is oriented in the downward direction 26 (e.g., oriented toward a ground of the loading dock 16). As illustrated in this example, as a point of contact between the cam surface 70 and the roller 66 shifts from the first contact point 80 to the second contact point 92, the barrier 18 rotates (e.g., pivots) from the stored position (FIG. 4), through the partially deployed position (FIG. 5), and to the raised position (FIG. 6) (e.g., a maximum deployed or raised position). As shown in FIG. 6, the rotation of the barrier 18 from the stored position (e.g., a fully stored position) to the raised position (e.g., a fully raised position or blocking position) occurs as the track follower 50 moves along a portion of the secondary track 48 from the first end 56 toward the second end 58. In the fully raised position, the barrier 18 of the illustrated example is closer to the main track 44 than when the barrier 18 is in the stored position, thereby reducing a horizontal distance that the rear impact guard 12 can freely travel away from the forward-facing wall 34. Additionally, in the raised position, the barrier 18 is positioned in a travel path of the rear impact guard 12, which can block movement of the rear impact guard 12 if the vehicle 14 attempts to leave the loading dock 16 when the barrier 18 is in the raised position (i.e., the blocking position). For example, in FIG. 6, the barrier 18 is in a first deployed, blocking position.

Referring to FIG. 7, to move the barrier 18 into engagement with the rear impact guard 12 (e.g., a capturing position), the drive unit 72a continues to rotate the pinion 82 in the counterclockwise direction 84, which causes the track follower 50 and the barrier 18 to continue movement in the rearward direction 22. In some examples, the drive unit 72a is powered to move the track follower 50 until the barrier 18 directly engages, contacts, restrains and/or otherwise captures the rear impact guard 12. In other words, the drive unit 72a moves the barrier 18 laterally along the secondary track 48 from the blocking position (FIG. 6) to the capturing position (FIG. 7). In some examples, the drive unit 72a moves the track follower 50 and the barrier 18 until the drive unit 72a experiences a resistive force of a particular magnitude or threshold and/or until the one or more sensors 91 (FIGS. 1-3) determine the barrier 18 is properly positioned (e.g., engaged) with the rear impact guard 12. In some examples, the drive unit 72a moves the track follower 50 and the barrier 18 to a specific distance in the rearward direction 22 to reduce a gap between the barrier 18 and the rear impact guard 12, but the barrier 18 does not directly engage the rear impact guard 12. For example, in FIG. 7, the barrier 18 is in a second deployed, capturing position. In some examples, the sensors 91 detect when the barrier 18 is in the capturing position. For example, the sensors 91 can include an ultrasonic sensor and/or a laser sensor to detect a distance (e.g., a horizontal distance) between the barrier 18 and the RIG 12. In some examples, the drive unit 72a moves the barrier 18 toward the RIG 12 until a distance (e.g., a horizontal distance) between the barrier 18 and the RIG 12 is less than a threshold (e.g., a maximum allowable distance of separation between the barrier 18 and the RIG 12). In some examples, the threshold can be approximately between a quarter of an inch and three-quarters of an inch (e.g., one-half inch). In some example, the threshold can be a direct engagement between the barrier 18 and the RIG 12.

To secure the barrier 18 in the deployed, capturing position (FIG. 7), the actuator 76a is activated to extend to lift the catch 74 from the release position (FIG. 6) to the holding position (FIG. 7). In the illustrated example, an extended moving end 94 of the actuator 76a travels along an inclined slot 96 formed in the catch 74 so that the linear (e.g., horizontal) movement of the extended end 94 translates to the vertical movement of the catch 74. Guide blocks 98 guide the vertical movement of the catch 74 between the release position and the holding position. In the holding position, a plurality of projections and/or voids 100 on the catch 74 engage rack 90 to firmly hold the track follower 50 and the barrier 18 in a locked position (e.g., preventing movement of the barrier 18 and/or the track follower 50 in the rearward direction 22 and/or the forward direction 20).

In some examples, the drive unit 72a can be reactivated to move the barrier 18 toward the RIG. 12 when the RIG 12 moves away from the barrier 18. For example, the sensors 91 can detect if the RIG 12 moves away from the barrier 18 to position at which a distance (e.g., a horizontal distance) between the barrier 18 and the RIG 12 is greater than a threshold (e.g., half an inch). In some such examples, the feedback (e.g., feedback signals) provided by the sensors 91 can cause the vehicle restraint 10 (e.g., a controller or system communicatively coupled to the sensors 91 and the vehicle restraint 10) to activate (e.g., reactivate) the drive unit 72a to move the barrier 18 toward the RIG 12 until the sensors 91 detect that the distance (e.g., the horizontal distance) between the barrier 18 and the RIG 12 is less than the threshold (e.g., a maximum allowable distance of separation between the barrier 18 and the RIG 12, direct engagement between the RIG. 12 and the barrier 18, etc.). In some examples, the actuator 76a can be actuated to move the catch 74 to the release position prior to the drive unit 72a moving the barrier 18 to a distance relative to the RIG 12 that is within the threshold. After the drive unit 72a moves the barrier 18 to a distance relative to the RIG 12 that is within the threshold, the actuator assembly 76a can be activated to move the catch 74 to the holding position.

To release the barrier 18 and enable the vehicle's rear impact guard 12 to disengage from the vehicle restraint 10a, the sequence illustrated in FIGS. 4, 5, 6 and 7 is performed in reverse. In other words, the actuator 76a retracts to lower the catch 74 from the holding position to the release position to release the voids and/or projections of the rack 90 of the track follower 50. The drive unit 72a rotates the pinion 82 in the clockwise direction 88, causing the upper pinions 86 to rotate in the counterclockwise direction 84. In turn, the track follower 50 moves in the forward direction 20 via engagement between the teeth (projections and/or voids) of the rack 90 and the upper pinions 86, which causes the barrier 18 to translate from the capturing position (FIG. 7) to the blocking position (FIG. 6) and then rotate from the raised position (FIG. 6), through the partially deployed position (FIG. 5), and to the stored position (FIG. 4). For example, when the cam surface 70 moves over or across the roller 66 at the second contact point 92 (e.g., the roller 66 closest to the first end 56 of the secondary track 48), the barrier 18 rotates (e.g., via gravity) counterclockwise about the pivot 64 such that the cam surface 70 then engages the roller 66 at the first contact point 80 (FIG. 4). The support bar 78 (e.g., a stop) restricts rotation of the barrier 18 in the counterclockwise direction 84 beyond the stored position of FIG. 4.

Figure 9:
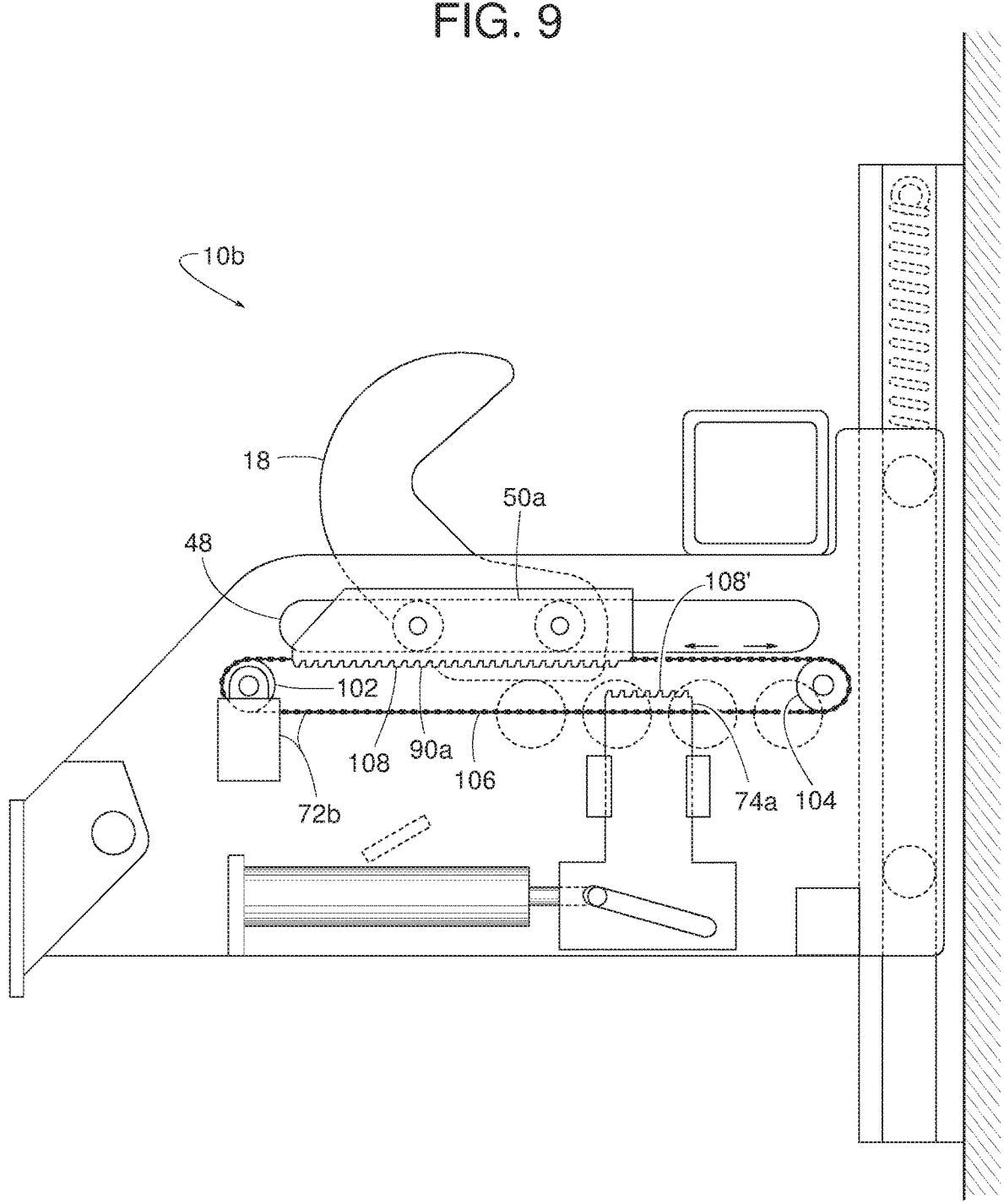
FIG. 9 is a side view similar to FIG. 6 but showing another example vehicle restraint disclosed herein that may implement the example vehicle restraint system of FIGS. 1-3.

FIG. 9 illustrates another example vehicle restraint 10b that may implement the vehicle restraint 10 of FIGS. 1-3. FIG. 9 corresponds to the position of vehicle restraint 10a shown in FIG. 6 (e.g., a partially, deployed position). The vehicle restraint 10b of the illustrated example operates in a similar manner as the vehicle restraint 10a, but with a few modifications. For instance, the vehicle restraint 10b of the illustrated example includes a drive unit 72b that employs a chain-and-sprocket assembly (e.g., instead of the rack-and-pinion assembly of the drive unit 72a of FIGS. 4-8) to move a track follower 50a along the secondary track 48. The drive unit 72b of the illustrated example includes a motor driven sprocket 102, an idler sprocket 104, and a roller chain 106. Opposite ends of the roller chain 106 are connected to the track follower 50a to drive the (e.g., horizontal) movement of the track follower 50a in the rearward direction 22 and/or the forward direction 20 when the roller chain 106 is driven via engagement with the motor driven sprocket 102 and the idler sprocket 104. The track follower 50a of the illustrated example includes a toothed rack 90a with projections and/or voids (i.e., teeth) 108 having a shape that provides a greater holding force when engaged with similar voids and/or projections (i.e., teeth) 108' in the catch 74a. For example, the teeth 108, 108' have an angled characteristic (e.g., a saw-tooth profile or shape).

Figure 10:
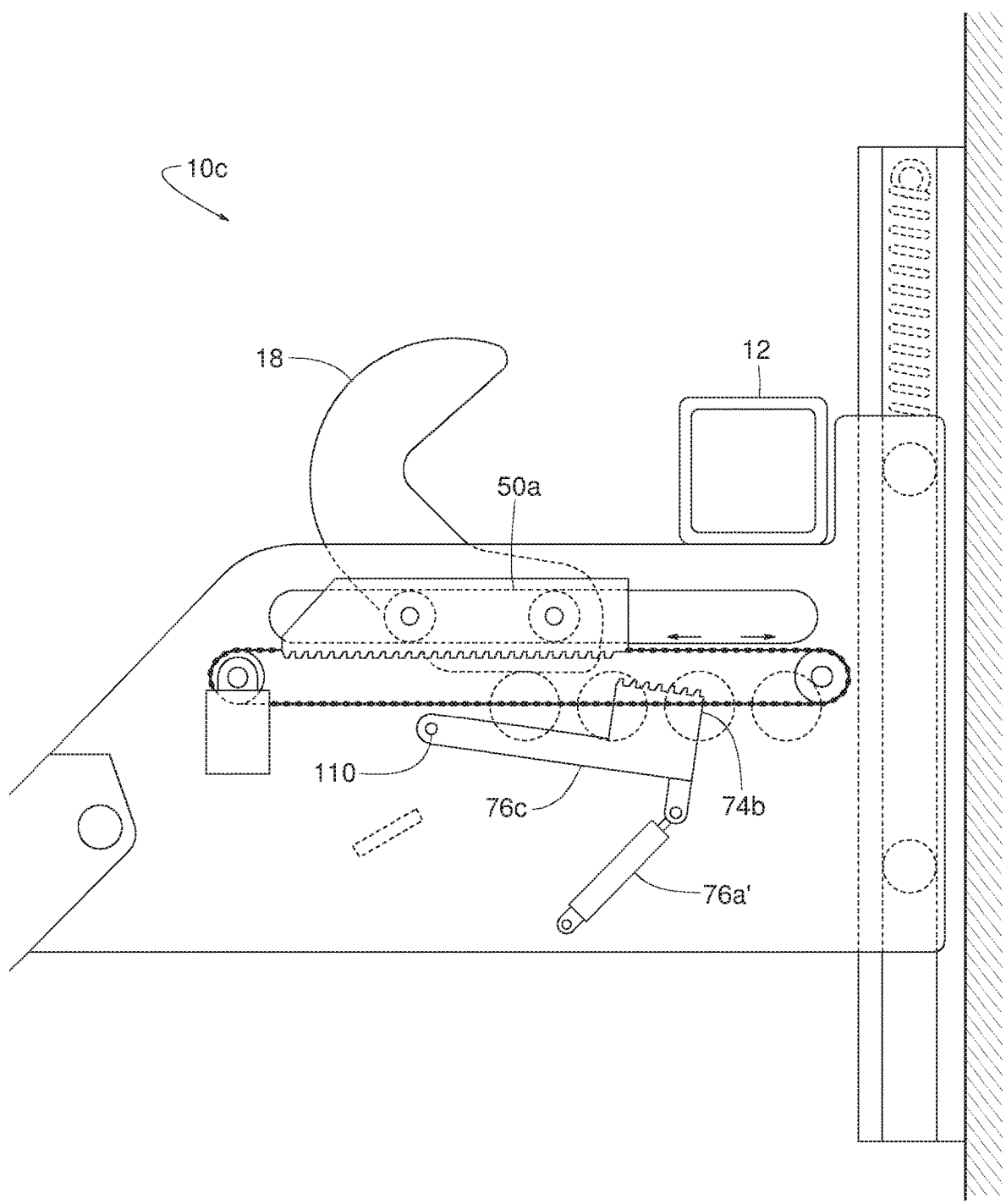
FIG. 10 is a side view similar to FIG. 6 but showing another example vehicle restraint disclosed herein that may implement the example vehicle restraint system of FIGS. 1-3.
Figure 11:
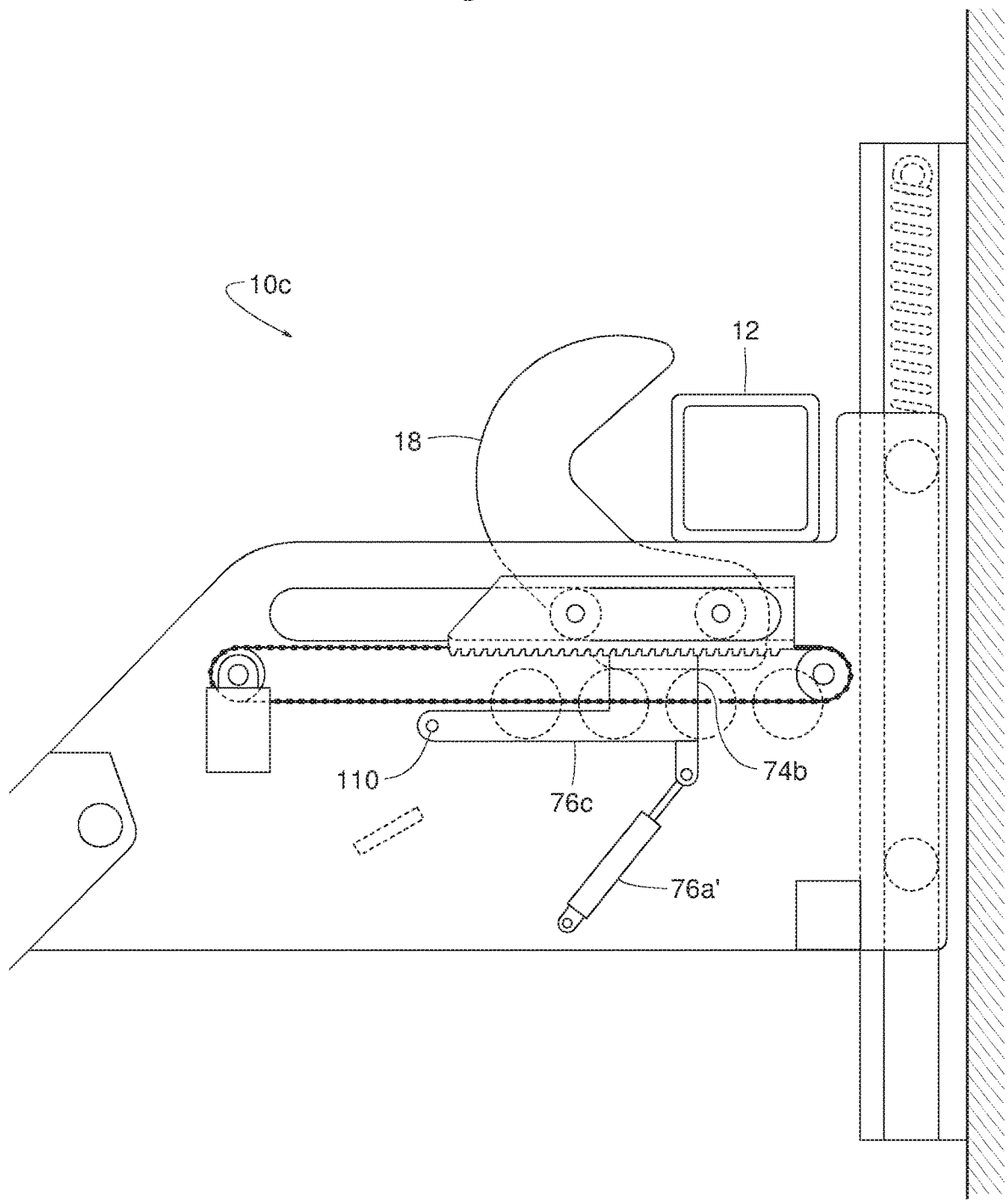
FIG. 11 is a side view similar to FIG. 7 but showing the example vehicle restraint of FIG. 10.

FIGS. 10 and 11 illustrate another example vehicle restraint 10c that may implement the vehicle restraint 10 of FIGS. 1-3. In the example shown in FIGS. 10 and 11, the vehicle restraint 10c includes a catch 74b that pivots or rotates relative to the track follower 50a (e.g., instead of vertically translating like the catch 74, 74a of FIGS. 4-9). Rather than vertical translation, an actuator 76a' (e.g., a hydraulic cylinder) actuates to cause the catch 74b to pivot or rotate about a pin 110 such that the catch 74b moves between a release position (FIG. 10) and a holding position (FIG. 11). The operation and structure of the vehicle restraint 10c is similar (e.g., identical) to that of the vehicle restraints 10a and 10b, where FIG. 10 corresponds to FIGS. 6 and 9, and FIG. 11 corresponds to FIG. 7.

Figure 12:
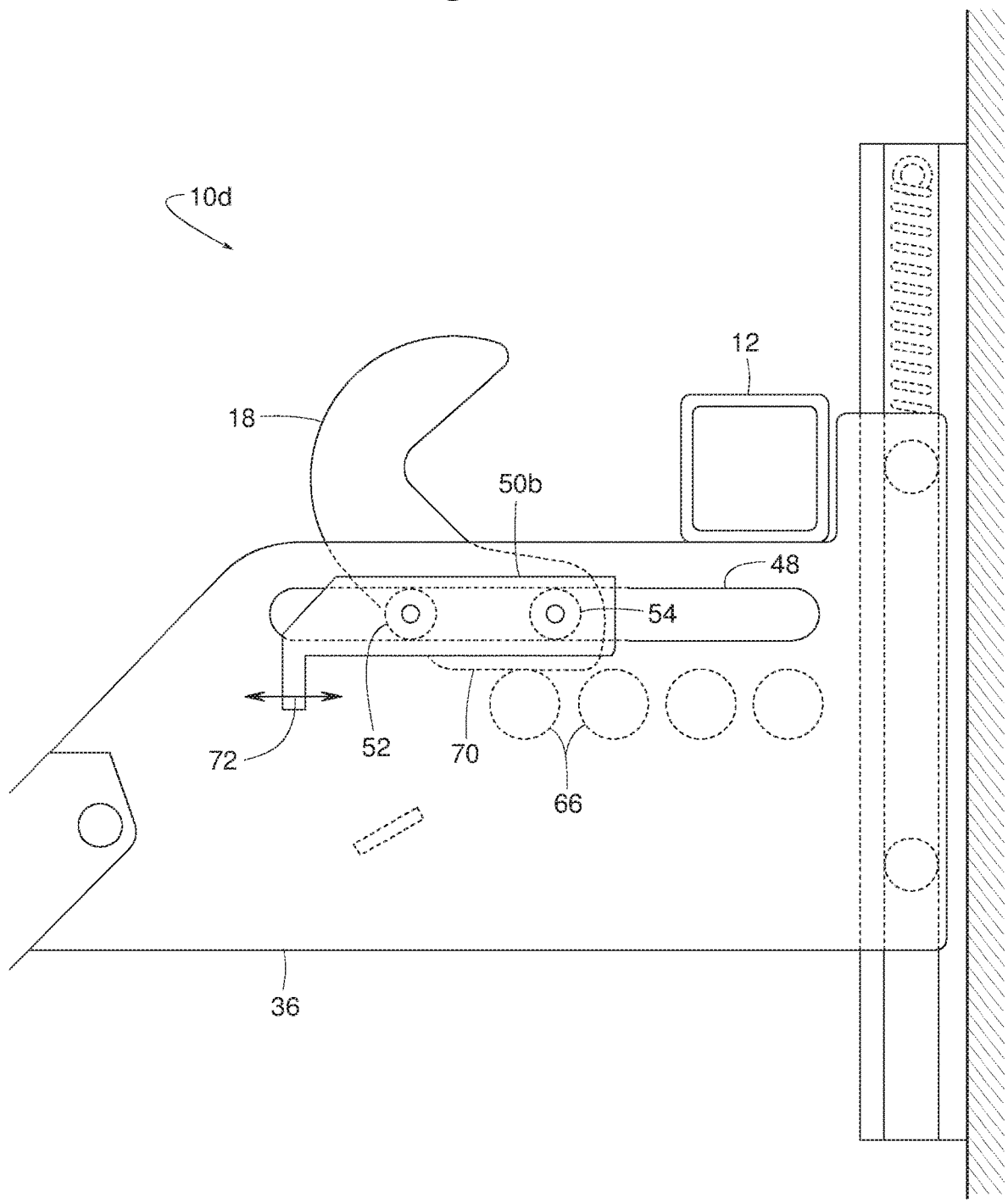
FIG. 12 is a side view similar to FIG. 6 but showing another example vehicle restraint disclosed herein that may implement the example vehicle restraint system of FIGS. 1-3.

FIG. 12 illustrates another example vehicle restraint 10d that may implement the vehicle restraint 10 of FIGS. 1-3. In the example shown in FIG. 12, the vehicle restraint 10d includes the drive unit 72 (e.g., a linear actuator) to move a track follower 50b and the barrier 18 along the secondary track 48. For example, in some examples, the drive unit 72 may be a linear actuator coupled to the track follower 50b that causes the barrier 18 to move between a raised position and a stored position in response to a change in length of the linear actuator. The drive unit 72 of the illustrated example also holds or locks the barrier 18 at the capturing position (e.g., at similar positions shown in FIGS. 7, 11, 16 and 20). As noted above, the drive unit 72 may be the drive unit 72a of FIGS. 4-8 (e.g., the powered rack-and-pinion assembly), the drive unit 72b of FIG. 9 (e.g., the powered chain-and-sprocket assembly), a powered leadscrew, an electric motor, a linear motor, a hydraulic cylinder, the drive unit 72c of FIGS. 21-24 (e.g., the powered pivotal arm), the drive unit 72d of FIGS. 25-28 and/or various combinations thereof, etc. Thus, the vehicle restraint 10d of the illustrated example does not include a catch (e.g., the catch 74, 74a, 74b of FIGS. 4-11), but may if implementing a different example drive unit such as the alternatives listed above.

Figure 13:
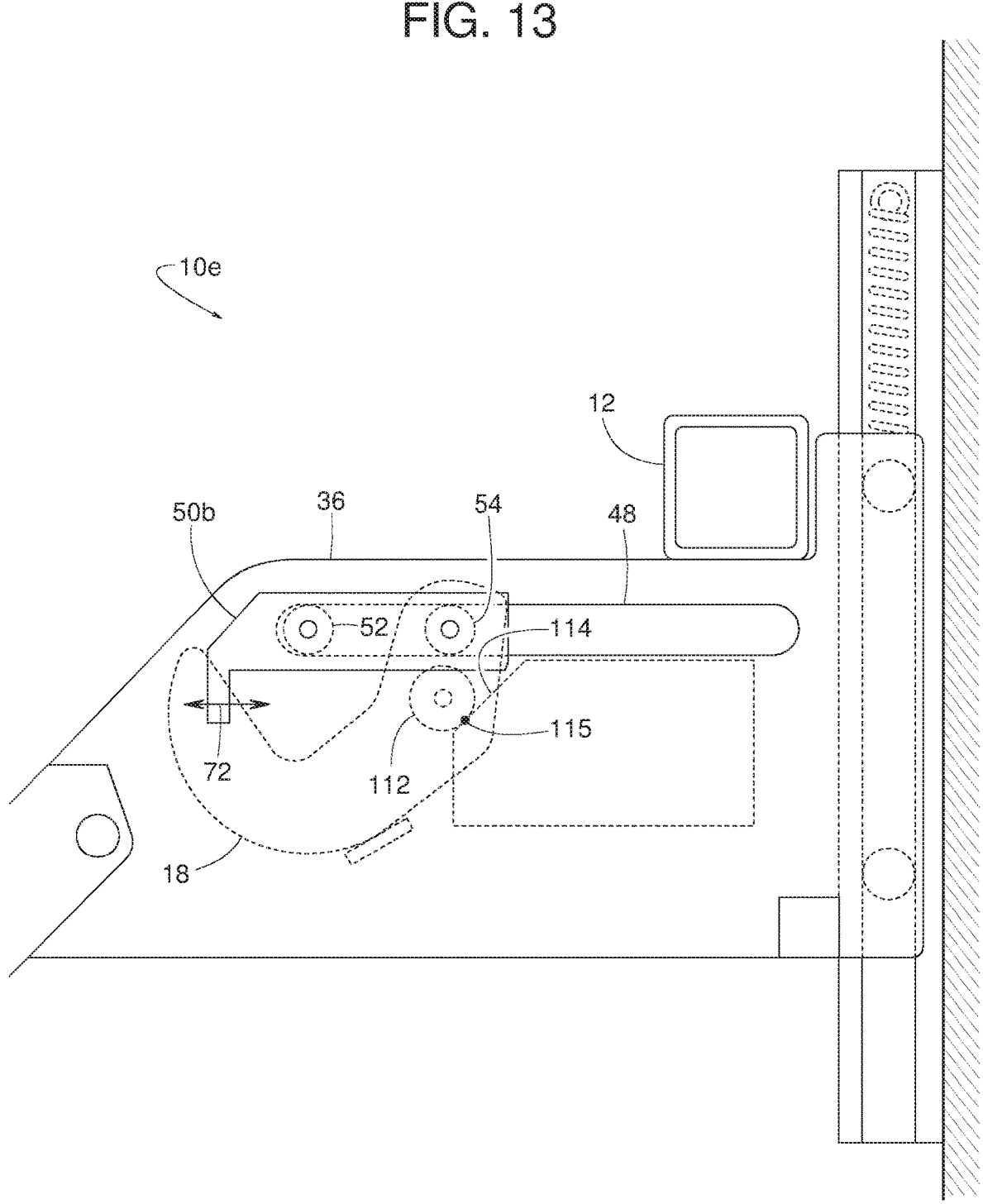
FIG. 13 is a side view similar to FIG. 4 but showing another example vehicle restraint disclosed herein that may implement the example vehicle restraint system of FIGS. 1-3.

FIGS. 13-16 illustrate another example vehicle restraint 10e that may implement the vehicle restraint 10 of FIGS. 1-3. Referring to FIGS. 13-16, the vehicle restraint 10e includes a roller 112 on the barrier 18 and a cam surface 114 on the carriage frame 36. The roller 112 is at a fixed location relative to the barrier 18. FIG. 13 shows the barrier 18 at a retracted lowered position (e.g., the stored position) with the roller 112 in engagement with (e.g., directly contacting or engaging) the cam surface 114 at a lower point of contact 115. The cam surface 114 of the illustrated example is angled or canted relative to horizontal.

Figure 14:
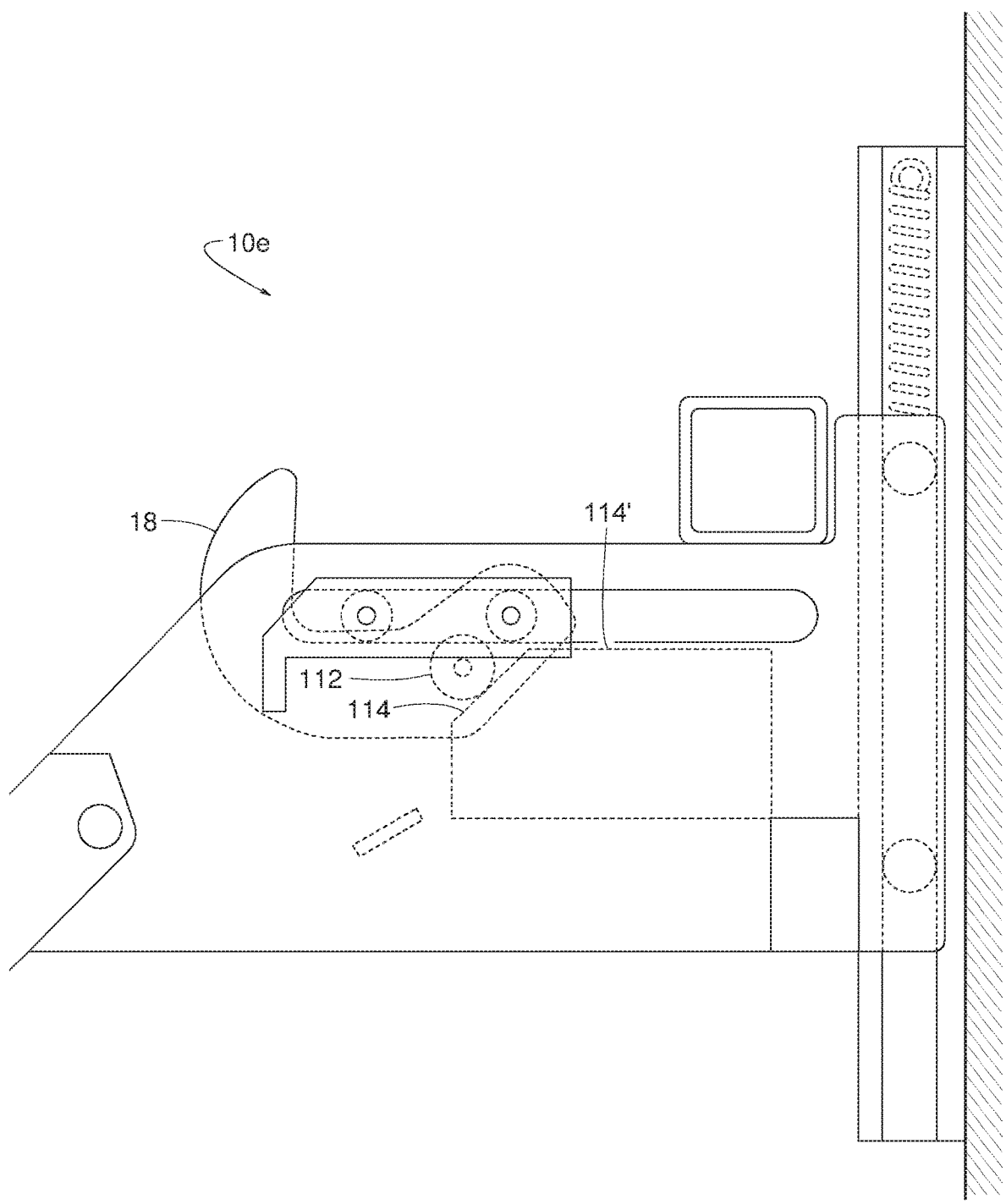
FIG. 14 is a side view similar to FIG. 5 but showing the example vehicle restraint of FIG. 13.
Figure 15:
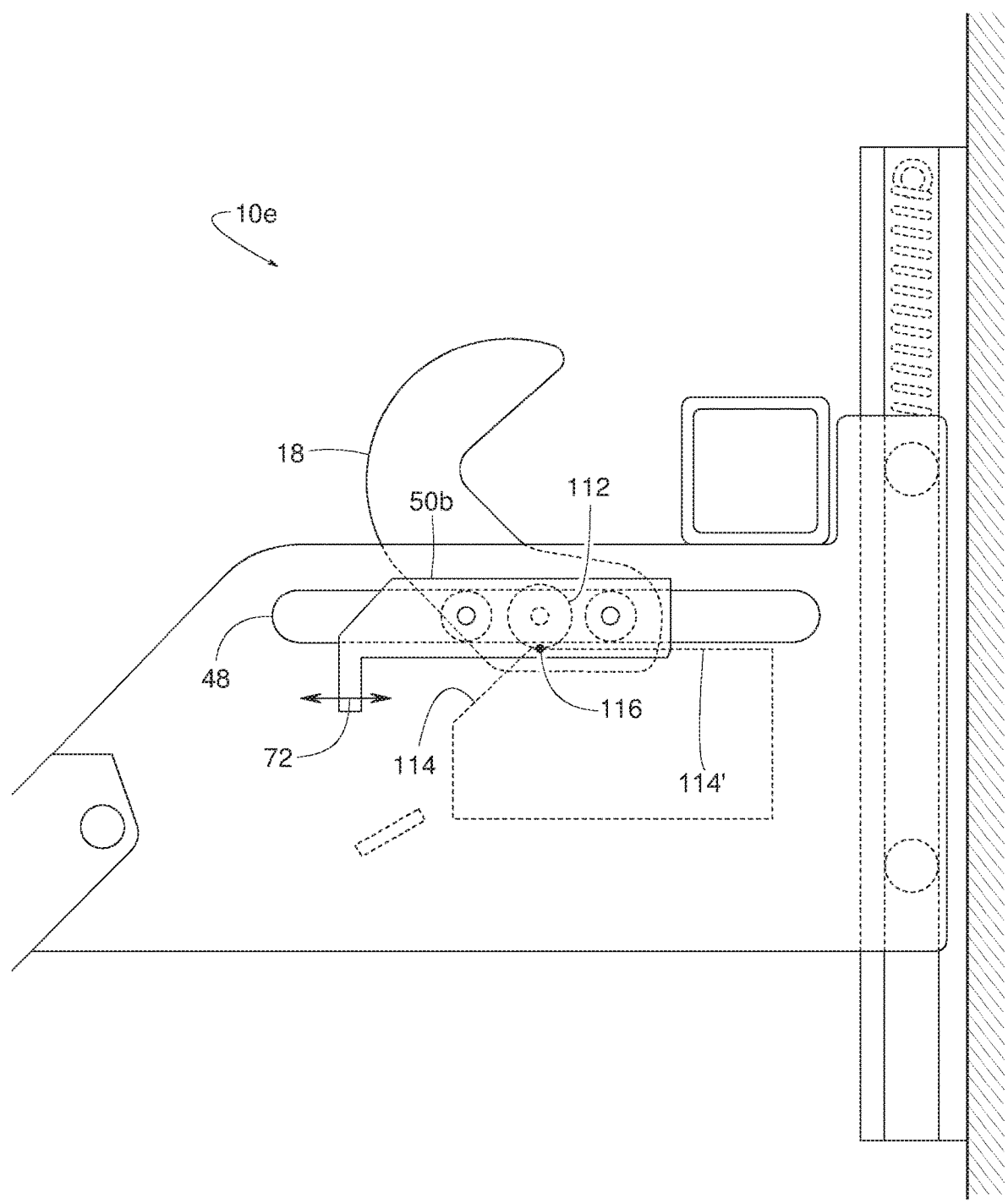
FIG. 15 is a side view similar to FIG. 6 but showing the example vehicle restraint of FIG. 13.
Figure 16:
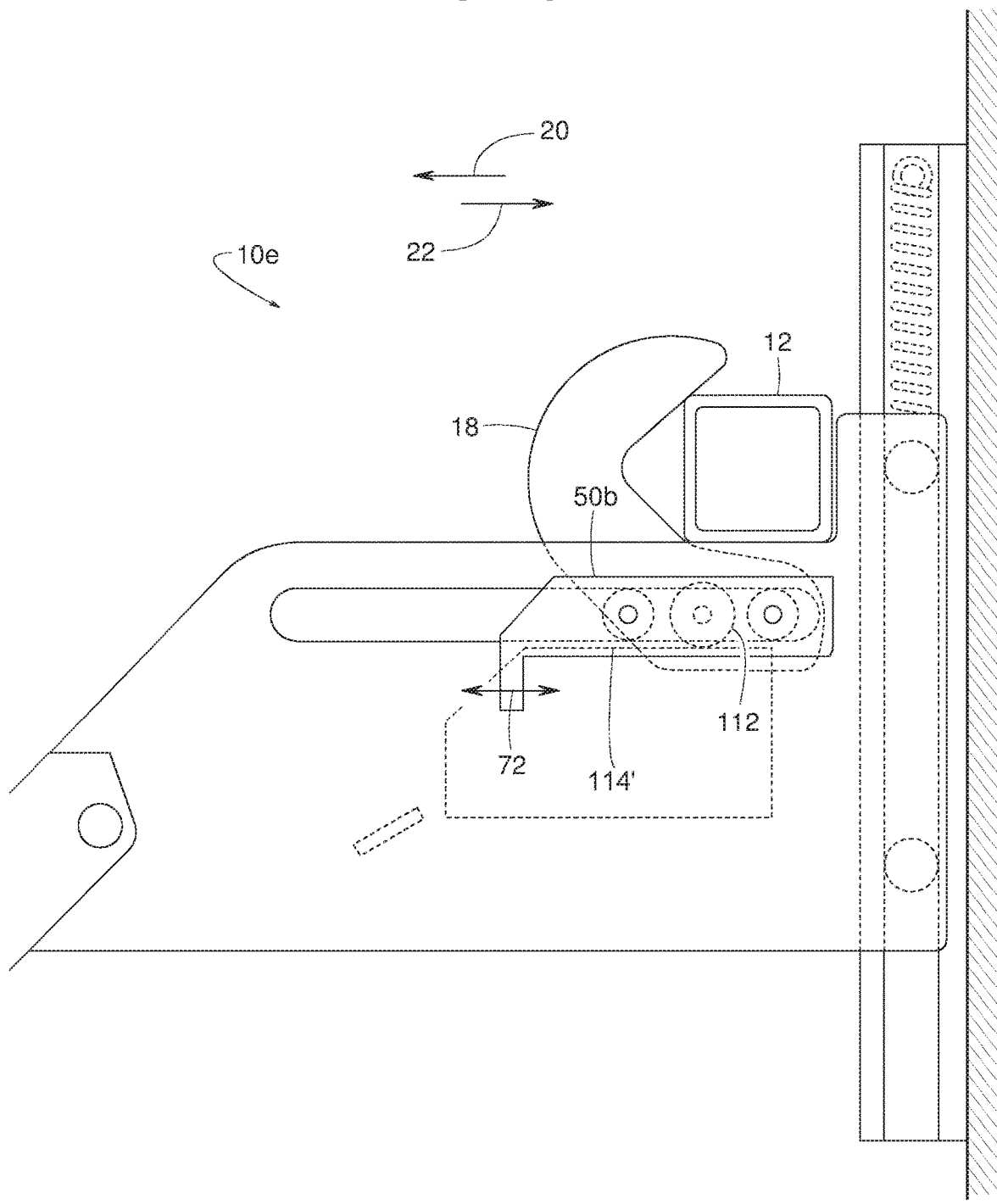
FIG. 16 is a side view similar to FIG. 7 but showing the example vehicle restraint of FIG. 13.

The operating sequence shown in FIGS. 13, 14, 15 and 16 corresponds to FIGS. 4, 5, 6 and 7, respectively. FIG. 13 shows the barrier 18 at the stored position (e.g., the retracted, lower position). Referring to FIG. 14, when the drive unit 72 (e.g., a linear actuator) moves the track follower 50b along secondary track 48 in the rearward direction 22 from initial position of FIG. 13 to the position of FIG. 14, the roller 112 moves (e.g., slides or rolls up) along the cam surface 114, which causes the barrier 18 to rotate in the clockwise direction 88 from the stored position (FIG. 13) to the position shown in FIG. 14. Referring to FIG. 15, as the drive unit 72 moves track follower 50b farther back along secondary track 48 in the rearward direction 22, the roller 112 moves along the cam surface 114 to engage cam surface 114 at an upper point of contact 116. When the roller 112 of the barrier 18 reaches the upper point of contact 116 of the cam surface 114, the barrier 18 of the illustrated example is in a fully raised position (FIG. 15). FIG. 16 shows the drive unit 72 having moved the track follower 50b in the rearward direction 22 to the capturing position (e.g., to cause the barrier 18 to engage the rear impact guard 12). As the barrier 18 moves between the fully raised position of FIG. 15 to the capturing position of FIG. 16, the roller 112 of the barrier 18 moves along a support surface 114' (e.g., a planar or flat surface). The support surface 114' is substantially flat or parallel relative to horizontal and/or is oriented in the upward direction 24 in the orientation of FIG. 16. In the illustrated example, the front roller 52 and the rear roller 54 are substantially equal in elevation (e.g., in the vertical direction) regardless of whether the barrier 18 is in the raised position, the stored position and/or the capturing position. However, the roller 112 moves between different elevations (e.g., in the vertical direction) when the barrier 18 moves between the stored position and the raised position. After the barrier 18 moves to the raised position and moves to the capturing position, the roller 112 is substantially equal in elevation relative to the front roller 52 and the rear roller 54.

To release the rear impact guard 12, the sequence illustrated in FIGS. 13, 14, 15 and 16 is performed in reverse. Specifically, the drive unit 72 moves track follower 50b in the forward direction 20, which moves the barrier 18 from the capturing position (FIG. 16) to the blocking position (FIG. 15). The drive unit 72 continues moving in the forward direction 20 until the roller 112 of the barrier 18 moves from the upper point of contact 116 of the cam surface 114 to the lower point of contact 115 to cause the barrier 18 to move or rotate from the raised position (FIG. 15), through an intermediate position (FIG. 14) and to the stored position (e.g., a lower retracted position) (FIG. 13). In the stored position of FIG. 13, the barrier 18 is not within a travel path of the rear impact guard 12 to allow the vehicle 14 to leave the loading dock 16.

FIGS. 17-20 illustrate another example vehicle restraint 10f that may implement the vehicle restraint 10 of FIGS. 1-3. In the example shown in FIGS. 17-20, the vehicle restraint 10f includes a front roller 118 on the barrier 18 in addition to a rear roller 54. The front roller 118 and the rear roller 54 travel along a secondary track 120 (e.g., formed in or carried by) of the carriage frame 36. The secondary track 120 includes a linear section 120a (e.g., a straight portion, a first portion, etc.) and a curved section 120b (e.g., a second portion) different than the linear section 120a. The term, "curved section" refers to a length of track that deviates from a straight path of an adjoining linear section (e.g., the linear section 12a). In some examples, the curved section 120b has a curvature extending along the section's length. In other examples, the curved section 120b is the result of the straight section (e.g., the linear section 12a) of the secondary track 120 turning or curving onto a generally straight but angled section of the secondary track 120. In other words, a longitudinal axis of the straight portion of the secondary track 120 is non-parallel to (e.g., canted or angled) relative to a longitudinal axis of the angled section of the secondary track 120. The front roller 118 interacts with secondary track 120 in a manner similar to the interaction of the roller 112 of FIG. 13 and the cam surface 114. For example, movement of the front roller 118 along the curved section 120b of the secondary track 120 causes the barrier 18 to rotate between the stored position (e.g., FIG. 17) and the raised position (e.g., FIG. 19), and movement of the front roller 118 along the linear section 120a of the secondary track 120 causes the barrier 18 to move between the blocking position (e.g., FIG. 19) and the capturing position (e.g., FIG. 20) via translation in the rearward direction 22 and the forward direction 20. In the illustrated example, the front roller 118 is at a higher elevation (e.g., in the vertical direction) when the barrier 18 is in the raised position than when the barrier 18 is in the stored position, and the rear roller 54 is a substantially constant elevation (e.g., in the vertical direction) when the barrier 18 is in the raised position and the stored position. In some examples, the secondary track 120 has a U-shaped configuration. For example, the secondary track 120 may include a first straight portion and a second straight portion positioned between a curved portion. In some such examples, the first straight portion and the curved portion cause the barrier to rotate between the stored position and the raised position, and the second straight portion causes the barrier 18 to translate to the capturing position.

Figure 17:
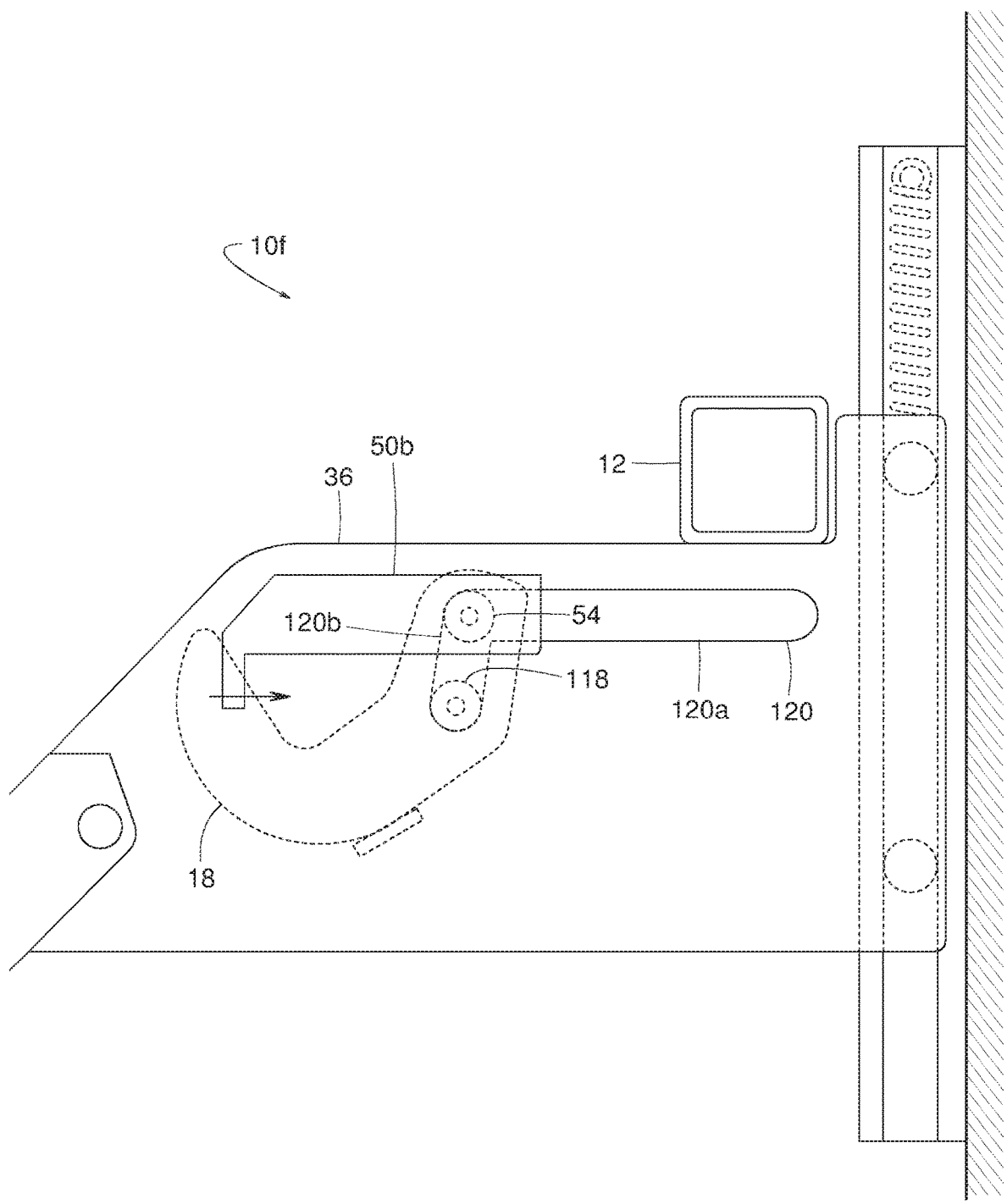
FIG. 17 is a side view similar to FIG. 4 but showing another example vehicle restraint disclosed herein that may implement the example vehicle restraint system of FIGS. 1-3.
Figure 18:
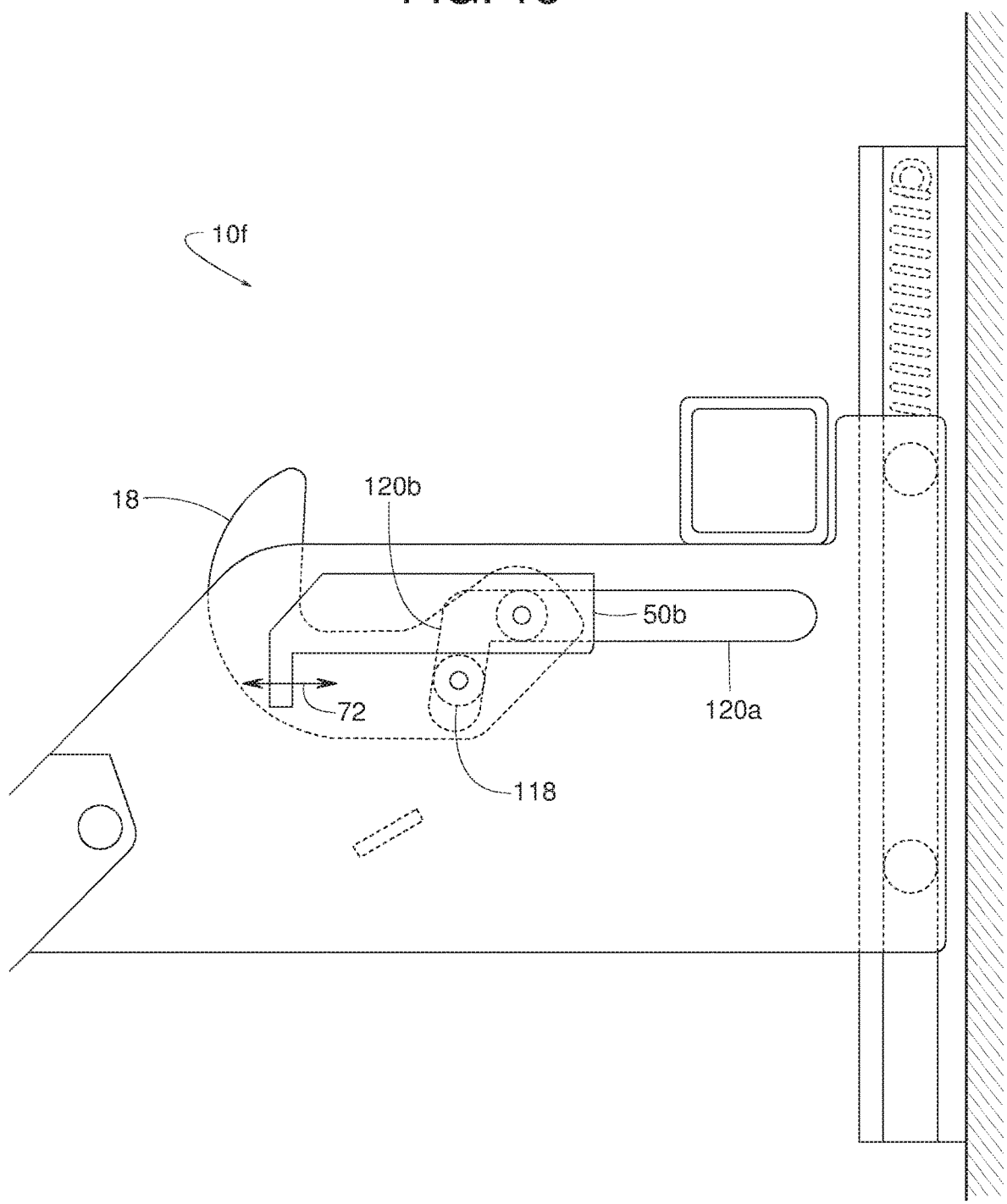
FIG. 18 is a side view similar to FIG. 5 but showing the example vehicle restraint of FIG. 17.
Figure 19:
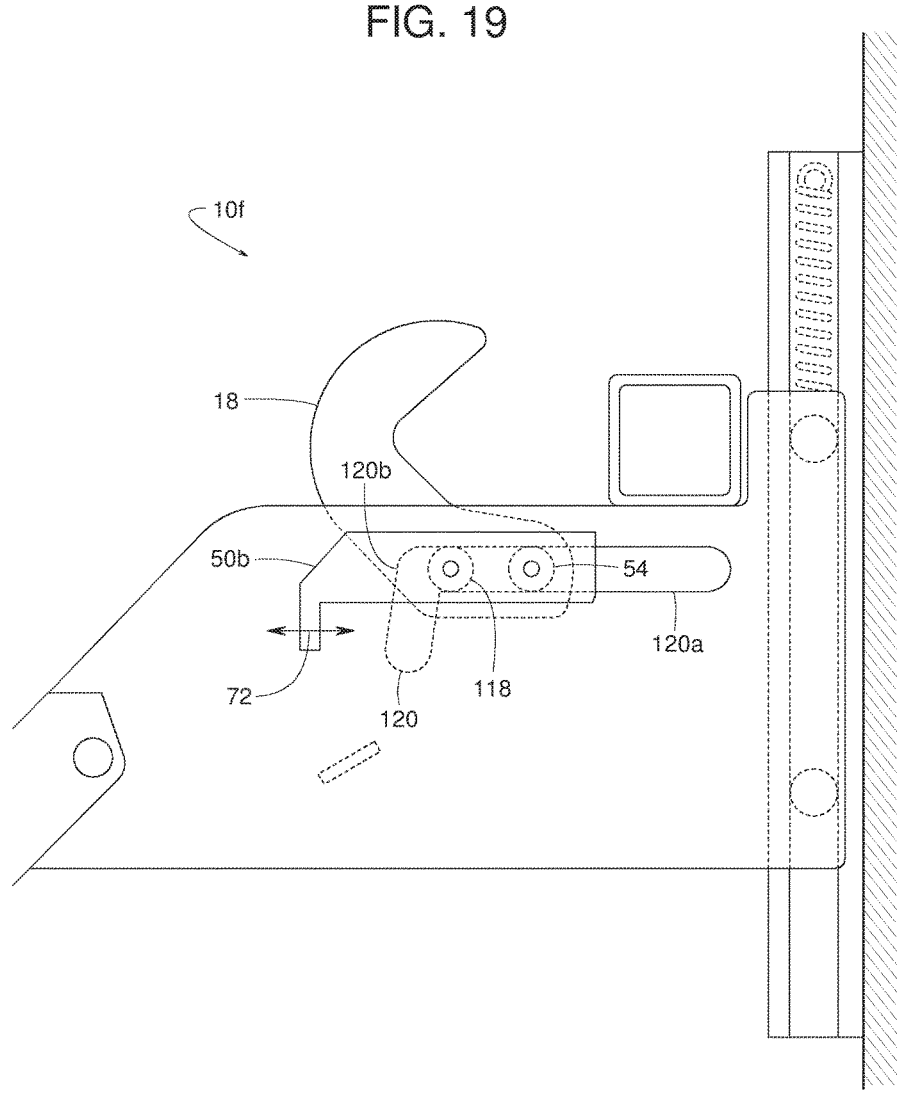
FIG. 19 is a side view similar to FIG. 6 but showing the example vehicle restraint of FIG. 17.
Figure 20:
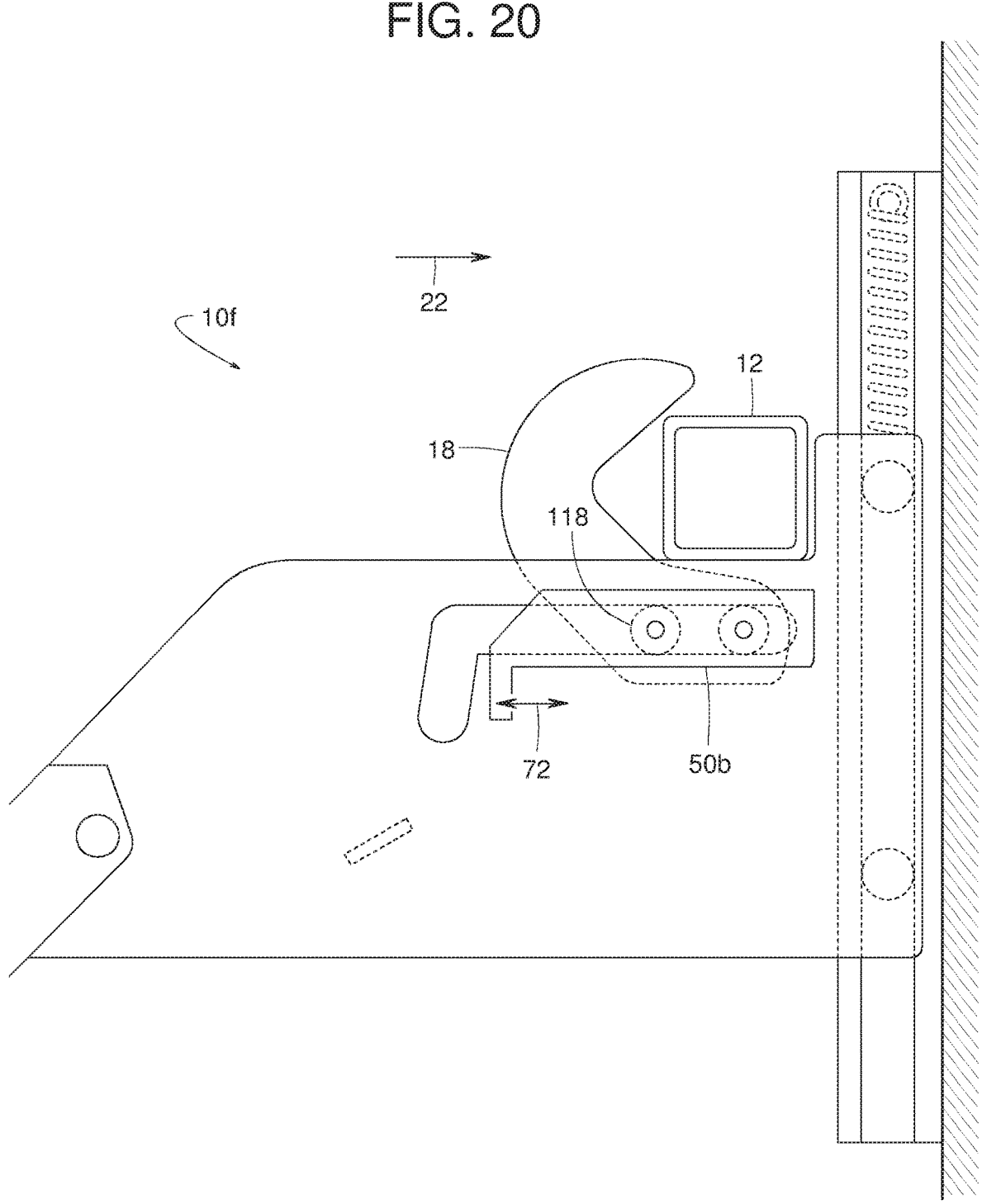
FIG. 20 is a side view similar to FIG. 7 but showing the example vehicle restraint of FIG. 17.

The operating sequence shown in FIGS. 17, 18, 19 and 20 corresponds to FIGS. 13, 14, 15 and 16, respectively. FIG. 17 shows the barrier 18 at the stored position (e.g., the retracted, lower position). Referring to FIG. 18, as the drive unit 72 (e.g., a linear actuator) moves (e.g., translates) the track follower 50b along the secondary track 120 in the rearward direction 22, the front roller 118 moves (e.g., slides or rolls up) along the curved section 120b of the secondary track 120. As the track follower 50b moves along the secondary track 120 and the front roller 118 moves along the curved section 120b, the barrier 18 moves to a partially deployed or blocking position shown in FIG. 18. Referring to FIG. 19, as the drive unit 72 moves the track follower 50b farther in the rearward direction 22 along the secondary track 120, the front roller 118 exits the curved section 120b and enters the linear section 120a. Thus, movement of the front roller 118 along the curved section 120b causes the barrier 18 to rotate between the stored position and the fully raised position (e.g., the blocking position) shown in FIG. 19. For example, the drive unit 72 may be a linear actuator coupled to the track follower 50b that causes the barrier 18 to move between a raised position and a stored position in response to a change in length of the linear actuator. Referring to FIG. 20, the drive unit 72 continues to move the track follower 50b in rearward direction 22 after the barrier 18 is in the blocking position (FIG. 19) to move or place the barrier 18 in the capturing position (e.g., in direct engagement with the rear impact guard 12). In the capturing position (FIG. 20), the barrier 18 secures the vehicle 14 (e.g., prevents or restricts movement of the vehicle 14 relative to the forward-facing wall 34). Thus, the barrier 18 rotates between the stored position and the raised position when the track follower 50b moves along a first portion (e.g., the curved section 120b) of the secondary track 120, and the barrier 18 translates from the blocking position to the capturing position (e.g., to engage the rear impact guard 12) when the track follower 50b moves along a second portion (e.g., the linear section 120a) of the secondary track 120 different than the first portion.

To release the rear impact guard 12, the sequence illustrated in FIGS. 17, 18, 19 and 20 is performed in reverse. Specifically, the drive unit 72 moves the track follower 50b in the forward direction 20 to release the rear impact guard 12 and move the barrier 18 from the capturing position (FIG. 20) to the blocking position (FIG. 19). The drive unit 72 moves in the forward direction 20 to cause the front roller 118 to move along the curved section 120b of the secondary track 120 and cause the barrier 18 to rotate from the fully raised position (FIG. 19), through the intermediate position (FIG. 18) and to the stored position (FIG. 17).

Figure 21:
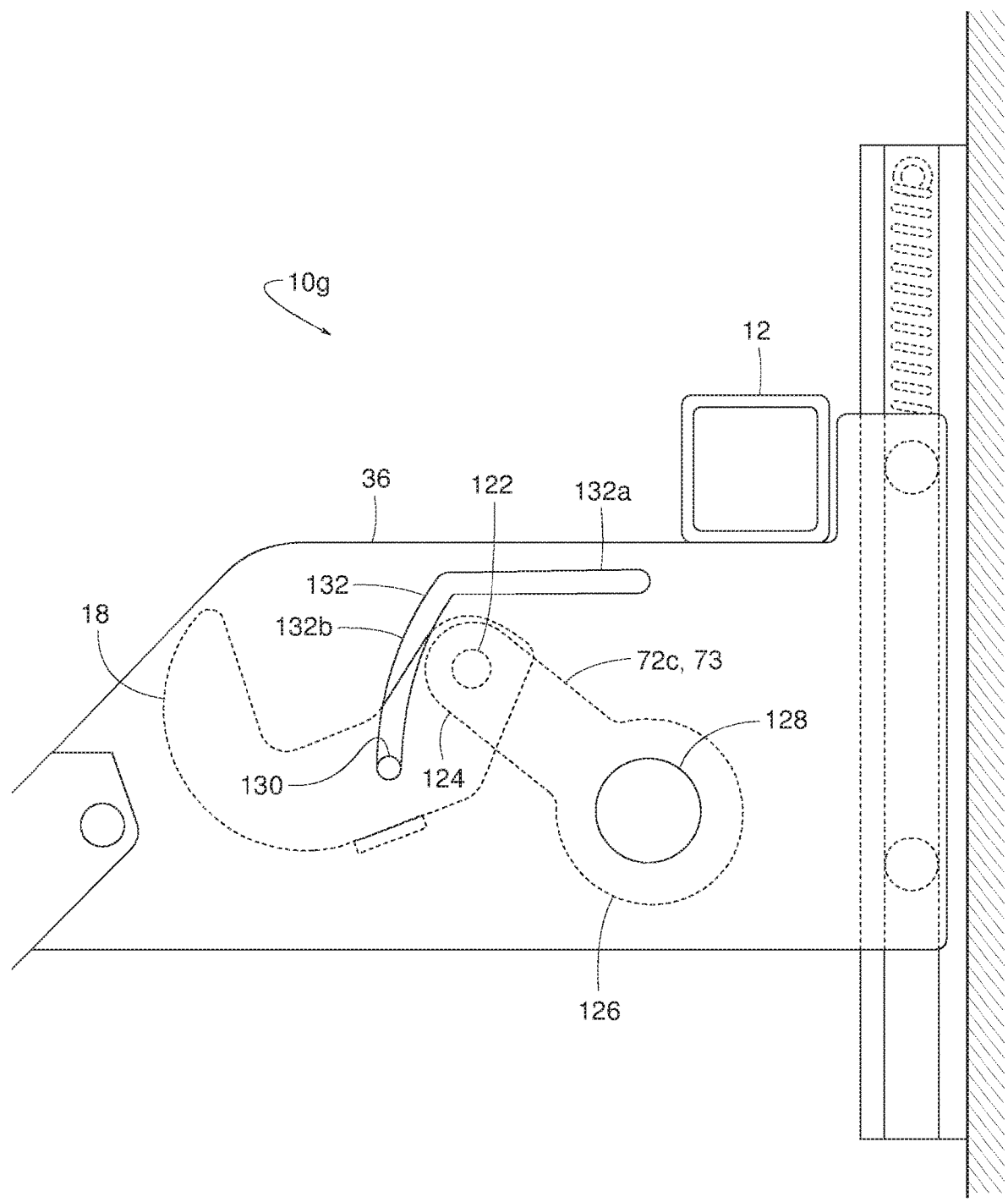
FIG. 21 is a side view similar to FIG. 4 but showing another example vehicle restraint disclosed herein that may implement the example vehicle restraint system of FIGS. 1-3.

FIGS. 21-24 illustrate another example vehicle restraint 10g that may implement the vehicle restraint 10 of FIGS. 1-3. In the example shown in FIGS. 21-24, the vehicle restraint 10g includes a drive unit 72c in the form of a pivotal arm 73 (e.g., a powered pivotal arm), which moves the barrier 18 to various positions (e.g., between the stored position (FIG. 21) and the capturing position (e.g., FIG. 24)). A pin 122 pivotally connects a first end 124 of the pivotal arm 73 to the barrier 18. A second end 126 of the pivotal arm 73 is keyed or otherwise attached (e.g., fixed) to a driven shaft 128 (e.g., a motor driven shaft). A track follower 130, in the form of a pin extending laterally outward from the barrier 18, extends into and/or travels along a secondary track 132 (e.g., a slot) of the carriage frame 36. In some examples, the secondary track 132 includes a straight section 132a and a curved section 132b to guide the barrier 18 to the various positions shown in FIGS. 21-24. FIG. 21 shows the barrier 18 at the stored position (e.g., a fully retracted position).

Figure 22:
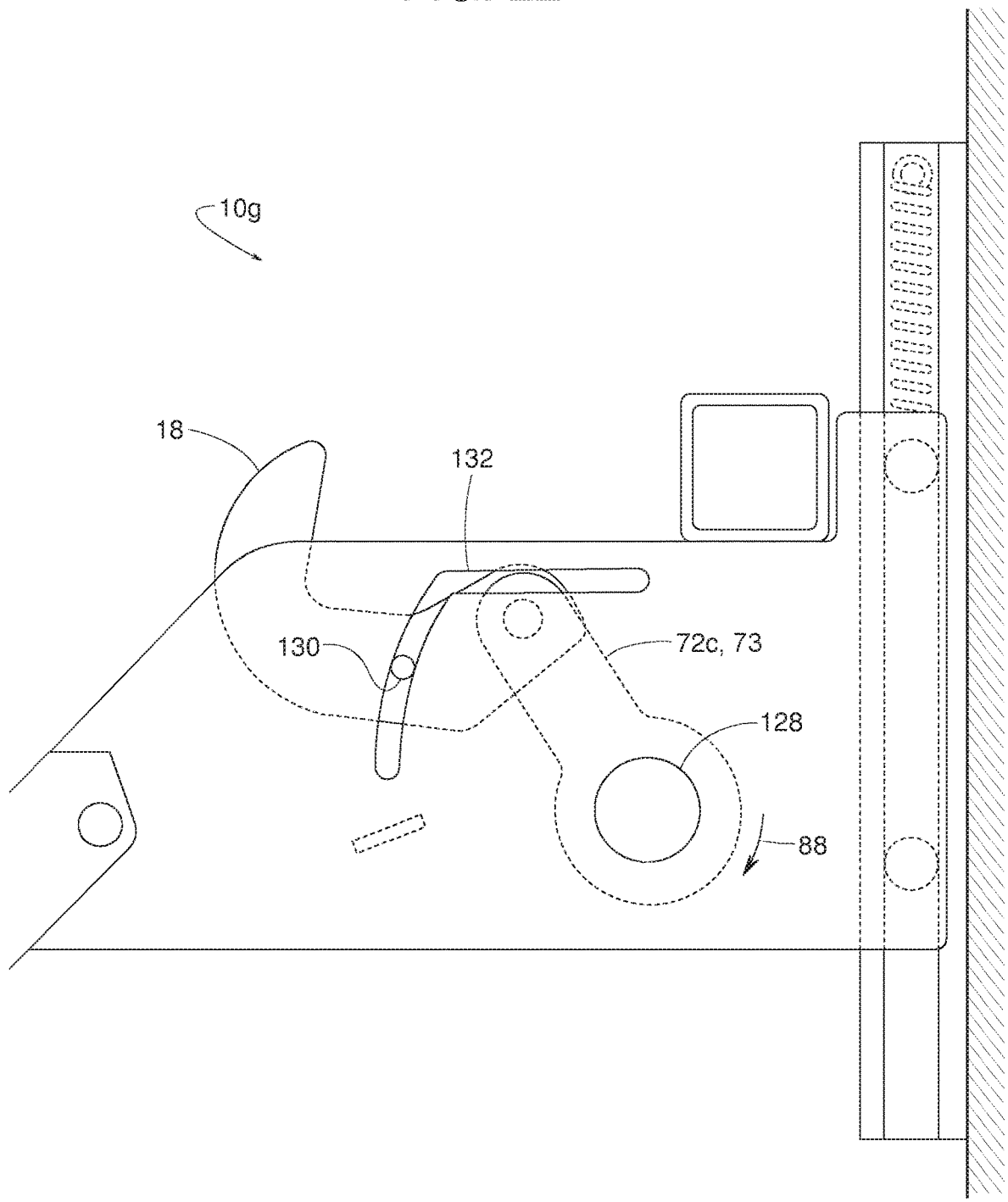
FIG. 22 is a side view similar to FIG. 5 but showing the example vehicle restraint of FIG. 21.
Figure 23:
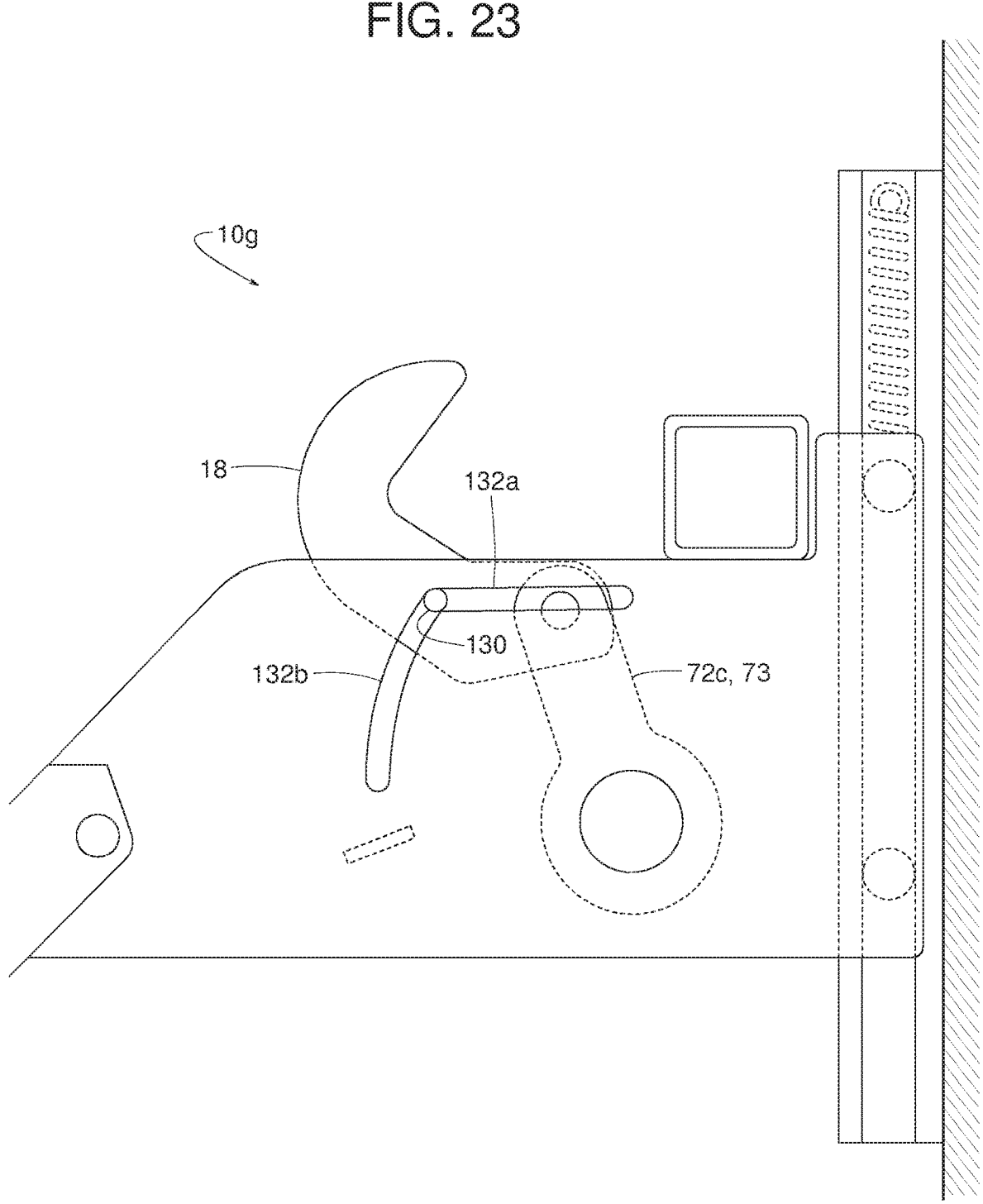
FIG. 23 is a side view similar to FIG. 6 but showing the example vehicle restraint of FIG. 21.
Figure 24:
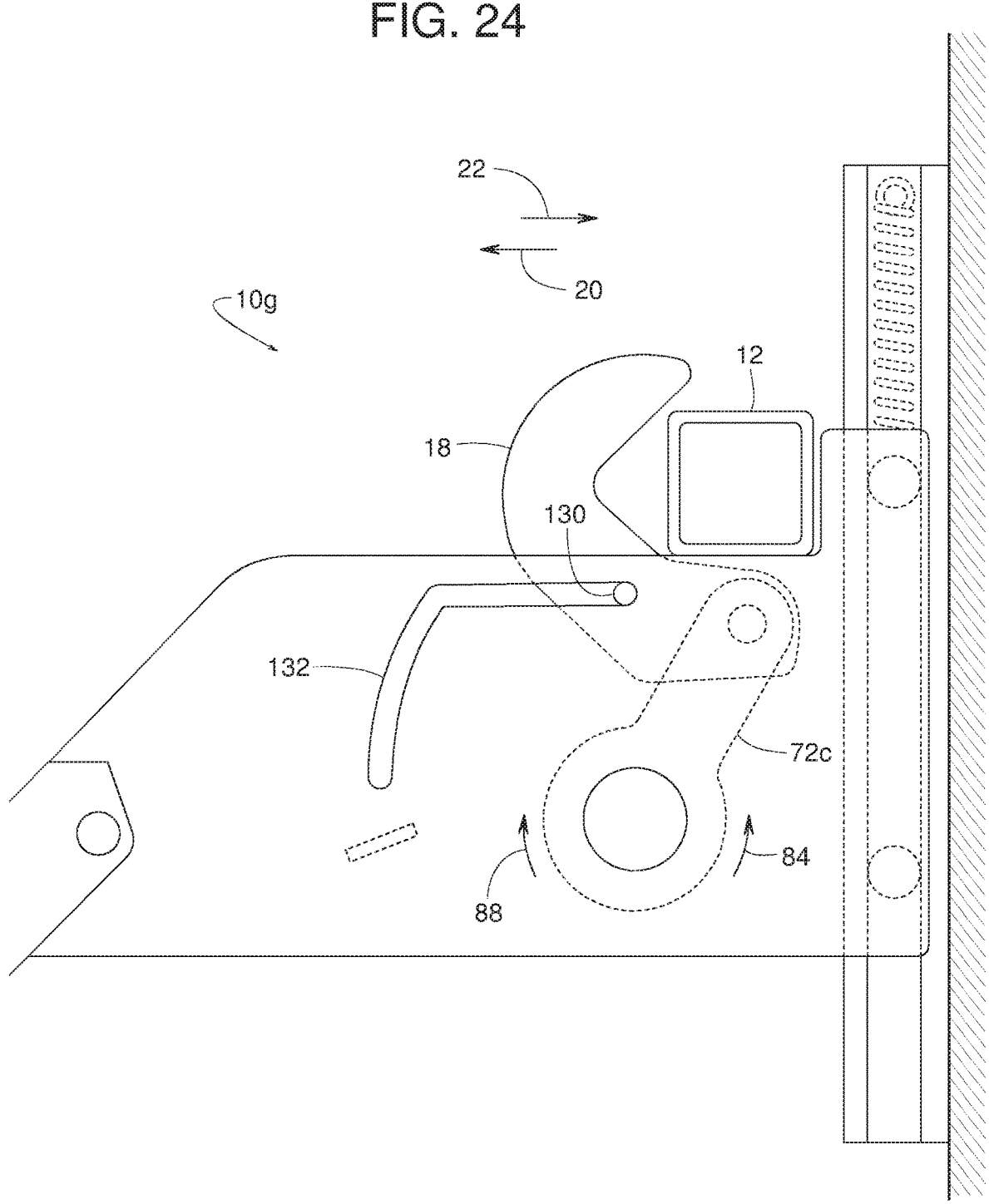
FIG. 24 is a side view similar to FIG. 7 but showing the example vehicle restraint of FIG. 21.

The operating sequence shown in FIGS. 21, 22, 23 and 24 corresponds to FIGS. 17, 18, 19 and 20, respectively. Referring to FIG. 22, as the driven shaft 128 rotates the pivotal arm 73 in the clockwise direction 88 (e.g., from the perspective of FIG. 22), the track follower 130 moves or travels in the upward direction 24 along a generally arcuate path defined by the curved section 132b of the secondary track 132. Accordingly, the barrier 18 rotates (e.g., tilts up) out of the carriage frame 36 to an intermediate position shown in FIG. 22. Referring to FIG. 23, as the pivotal arm 73 continues to rotate farther in the clockwise direction 88, the track follower 130 reaches an upper end of curved section 132b and enters the straight section 132a of the secondary track 132. For example, as the track follower 130 moves along the curved section 132b, the barrier 18 rotates relative to the carriage frame 36. When the track follower 130 of the illustrated example reaches the straight section 132a of the secondary track 132, the barrier 18 is in a fully raised position (e.g., a blocking position). Referring to FIG. 24, further rotation of the pivotal arm 73 in the clockwise direction 88 causes the track follower 130 to move in the rearward direction 22 along the straight section 132a of the secondary track 132 to translate the barrier 18 rearward and position the barrier 18 in engagement with the rear impact guard 12 (e.g., the capturing position). Thus, the barrier 18 rotates relative to the carriage frame 36 when the track follower 130 moves along the curved section 132b of the secondary track 132 and translates relative to the carriage when the track follower 130 moves along the straight section 132a of the secondary track 132.

To release the rear impact guard 12, the sequence illustrated in FIGS. 21, 22, 23 and 24 is performed in reverse. Specifically, the pivotal arm 73 rotates in the counterclockwise direction 84 (from the perspective of FIG. 24) to move the track follower 130 in the forward direction 20 along the straight section 132a of the secondary track 132 to cause the barrier 18 to translate or shift from the capturing position (FIG. 24) to the blocking position (FIG. 23). Further rotation of the pivotal arm 73 in the counterclockwise direction 84 causes the track follower 130 to move in the curved section 132b of the secondary track 132 to cause the barrier 18 to rotate from the raised position (FIG. 23), through an intermediate position (FIG. 22), and to the stored position (FIG. 21).

Figure 25:
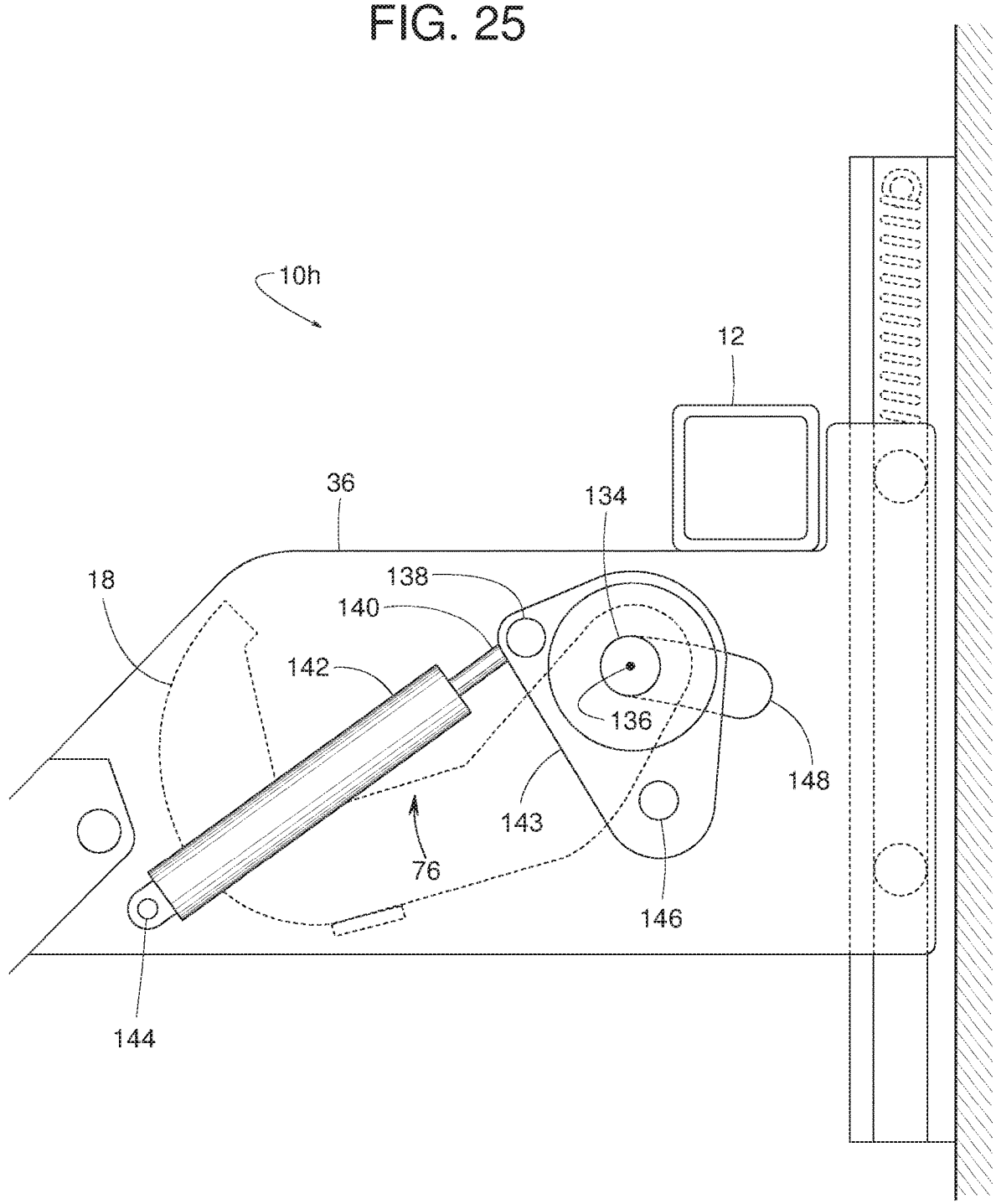
FIG. 25 is a side view similar to FIG. 4 but showing another example vehicle restraint disclosed herein that may implement the example vehicle restraint system of FIGS. 1-3.
Figure 26:
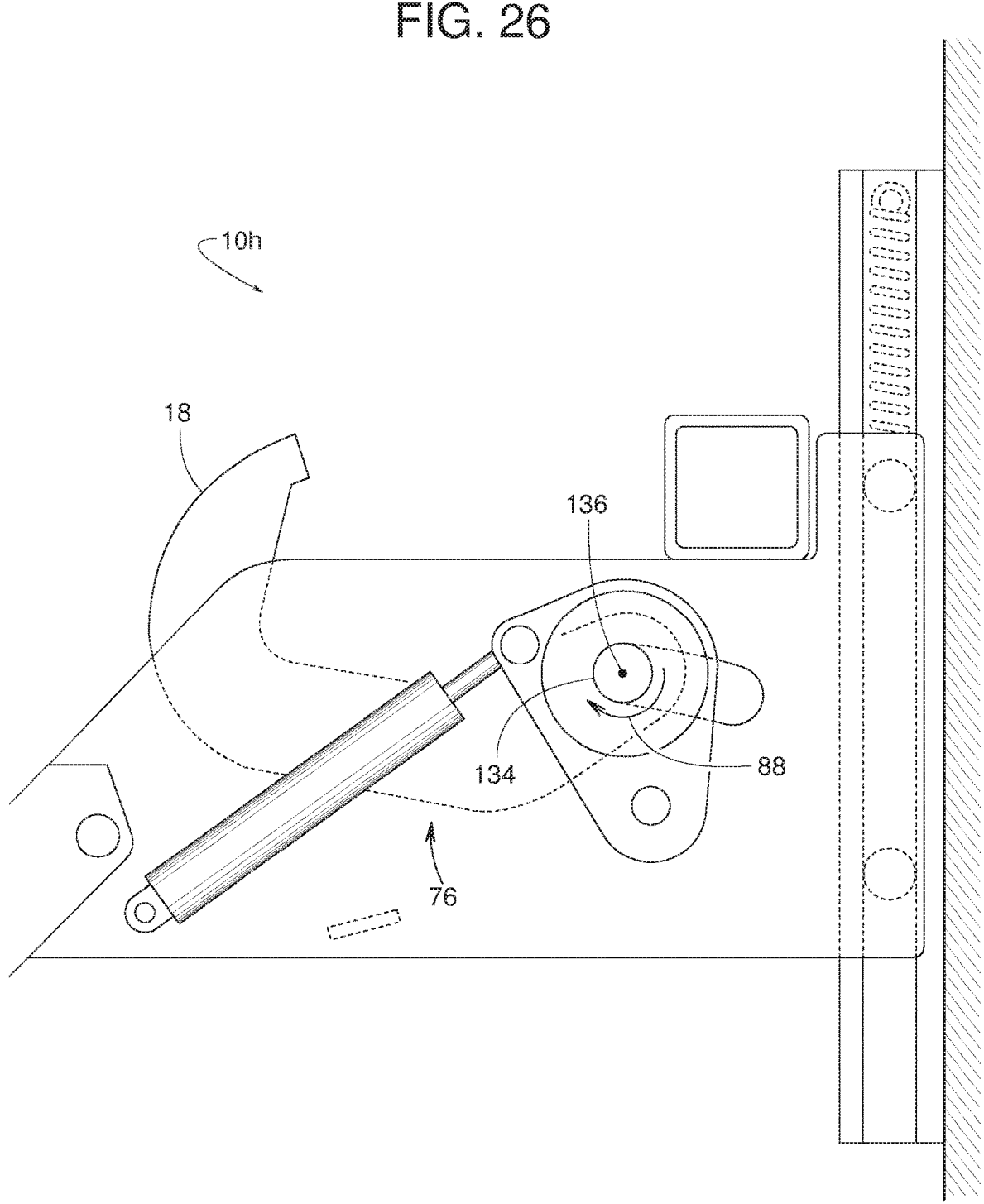
FIG. 26 is a side view similar to FIG. 5 but showing the example vehicle restraint of FIG. 25.
Figure 27:
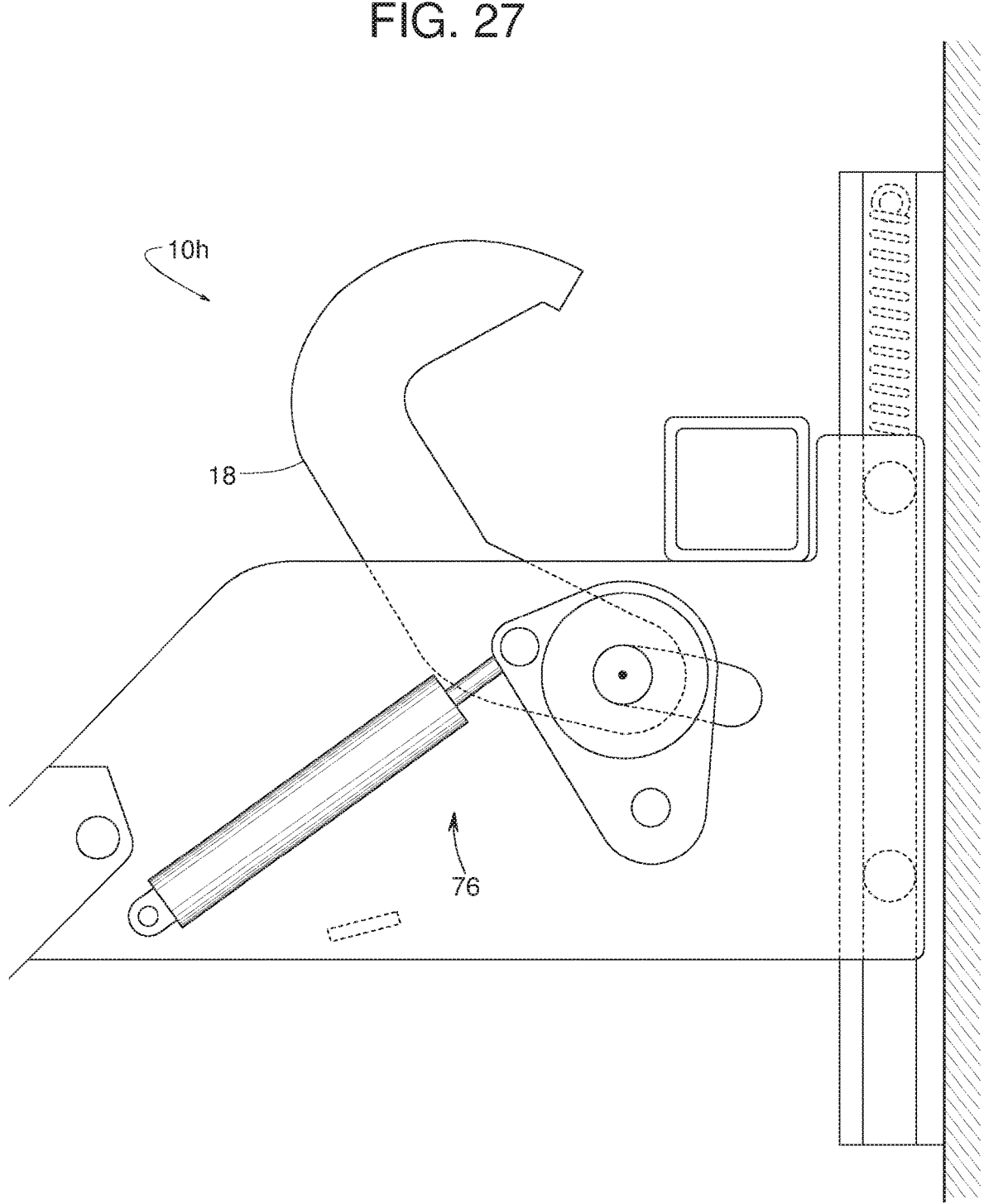
FIG. 27 is a side view similar to FIG. 6 but showing the example vehicle restraint of FIG. 25.

FIGS. 25-28 illustrate another example vehicle restraint 10h that may implement the vehicle restraint 10 of FIGS. 1-3. In the example shown in FIGS. 25-28, the vehicle restraint 10h includes a drive shaft 134 that is keyed or otherwise affixed to the barrier 18 such that rotation of the drive shaft 134 about a rotational axis 136 causes rotation of the barrier 18. The drive shaft 134 of the illustrated example may be driven (e.g., rotated) via a motor (e.g., an electric motor). The drive shaft 134 rotates the barrier 18 about a rotational axis 136 between the stored position (FIG. 25) and the raised position (FIGS. 27 and 28). The vehicle restraint 10h of the illustrated example includes a drive unit 72d that includes an actuator 142 (e.g., a hydraulic cylinder, a powered leadscrew, a linear motor, a powered rack-and-pinion assembly, a powered chain-and-sprocket assembly, an electric motor, a powered pivotal arm, and various combinations thereof, etc.) to drive a pivot arm 143. For example, the drive unit 72 may be a linear actuator coupled to the pivot arm 143 that causes the barrier 18 to move between a blocking position and a capturing position in response to a change in length of the linear actuator. The pivot arm 143 of the illustrated example is a bracket. A first pin 138 pivotally connects the pivot arm 143 to a moving end 140 of the actuator 142. An opposite end 144 of the actuator 142 connects pivotally to the carriage frame 36. A second pin 146 pivotally connects the pivot arm 143 to the carriage frame 36. The pivot arm 143 rotates relative to the carriage frame 36 about the second pin 146. The pivot arm 143 has selectively a tilted forward position and a tilted back position, where the barrier 18 is in the blocking position in response to the pivot arm 143 being in the tilted forward position and the barrier 18 is in the capturing position in response to the pivot arm 143 being in the titled back position. The rotation of the pivot arm 143 about the second pin 146 shifts the barrier 18 between the blocking position (FIG. 27) and the capturing position (FIG. 28). FIG. 25 shows the barrier 18 at stored position (e.g., a lowered position beneath an upper surface of the carriage frame 36).

The operating sequence shown in FIGS. 25, 26, 27 and 28 corresponds to that of FIGS. 21, 22, 23 and 24, respectively. Referring to FIG. 26, rotation of the drive shaft 134 about the rotational axis 136 in the clockwise direction 88 (e.g., from the perspective of FIG. 26) causes the barrier 18 to rotate from the stored position of FIG. 25 to a partially raised, intermediate position of FIG. 26. Further rotation of the drive shaft 134 in the clockwise direction 88 causes the barrier 18 rotate (e.g., in the upward direction 24) to the raised position of FIG. 27. In FIG. 27, the barrier 18 is shown in the raised or blocking position (e.g., a fully rotational position in the clockwise direction 88). The pivot arm 143 is in the tilted back position. To move or shift (e.g., laterally shift) the barrier 18 to the capturing position of FIG. 28, the actuator 142 extends to rotate or pivot the pivot arm 143 in the clockwise direction 88 (from the perspective of FIG. 28) about the second pin 146. Accordingly, as the pivot arm 143 pivots about the second pin 146, the drive shaft 134 travels in the rearward direction 22 along a secondary track 148 (e.g., a curved slot) in the carriage frame 36. Rotation of the pivot arm 143 via the actuator 142 in the clockwise direction 88 relative to the second pin 146 and shifting of the drive shaft 134 in the rearward direction 22 causes the barrier 18 to shift or move laterally in the rearward direction 22 toward the rearward-facing wall. As a result, the barrier 18 moves from the blocking position (FIG. 27) to the capturing position (FIG. 28). FIG. 28 shows barrier 18 capturing the rear impact guard 12. Thus, in the illustrated example, the barrier 18 of the illustrated example rotates relative to the carriage frame 36 between the stored position and the raised position via a first drive (e.g., a motor), and then translates relative to carriage frame 36 between the blocking position and the capturing position via the drive unit 72d that is different than the first drive.

To release the rear impact guard 12, the sequence illustrated in FIGS. 25, 26, 27 and 28 is performed in reverse. Specifically, the actuator 142 retracts to pivot the pivot arm 143 in the counterclockwise direction 84 about the second pin 146 and cause the drive shaft 134 to move in the forward direction 20 via the secondary track 148 (e.g., from the tilted rearward to the tilted forward position). Such movement causes the barrier 18 to move (e.g., laterally shift) in the forward direction 20 and away from the rear impact guard 12. For example, the barrier 18 moves in the forward direction 20 from the capturing position (FIG. 28) to the blocking position (FIG. 27), where the barrier 18 is also in the fully raised position. The drive shaft 134 is rotated in the counterclockwise direction 84 to cause a corresponding rotation of the barrier 18 about the rotational axis 136 in the counterclockwise direction 84 and rotate the barrier 18 from the raised position (FIG. 27), through a partially deployed position (FIG. 26) and then to the stored position (FIG. 25). The pivot arm 143 remains in the tilted forward position during the rotation of the drive shaft 134.

At least some of the aforementioned examples include one or more features, characteristics and/or benefits including, but not limited to, the following:

In some examples, a vehicle restraint to block and release a vehicle at a loading dock includes a main track and a carriage frame movable vertically along the main track. The vehicle restraint includes a secondary track supported by the carriage frame. The secondary track defines a front end and a rear end, where the main track is closer to the rear end than to the front end. A track follower is movably coupled to the carriage frame via the secondary track, the track follower movable between the front end and the rear end of the secondary track. A barrier is pivotally coupled to the track follower at a pivot point. The barrier is to rotate relative to the carriage frame between a raised position and a stored position, and the barrier is to translate relative to the carriage frame between the front end and the rear end of the secondary track. The barrier is to rotate from the stored position to the raised position prior to the barrier moving to the rear end of the secondary track to a capturing position to restrain a rear impact guard of the vehicle.

In some examples, the barrier is to rotate between the stored position and the raised position when the track follower moves along a first portion of the secondary track, and the barrier is to translate to the capturing position when the track follower moves along a second portion of the secondary track.

In some examples, the pivot point is at a substantially fixed location relative to the barrier, and the main track is closer to the pivot point when the barrier is at the raised position than when the barrier is at the stored position.

In some examples, the secondary track is substantially linear.

In some examples, the secondary track is curved.

In some examples, the secondary track includes a substantially linear section and a curved section.

In some examples, the secondary track is a slot defined by the carriage frame.

In some examples, the track follower includes a front roller and a rear roller in guided relationship with the secondary track, the main track being closer to the rear roller than to the front roller.

In some examples, the front roller and the rear roller are substantially equal in elevation regardless of whether the barrier is in the raised position or the stored position.

In some examples, the front roller is at a higher elevation when the barrier is in raised position than when the barrier is in the stored position, and the rear roller is at a substantially constant elevation when the barrier is in the raised position and the stored position.

In some examples, a linear actuator is coupled to the track follower. The barrier moves between the raised position and the stored position in response to a change in length of the linear actuator.

In some examples, the linear actuator is a hydraulic cylinder.

In some examples, the linear actuator includes an electric motor.

In some examples, the linear actuator includes a chain and a sprocket.

In some examples, the linear actuator includes a pinion gear to engage a toothed rack.

In some examples, the linear actuator includes a plurality of pinion gears enmeshed with a toothed rack.

In some examples, a pivotal arm has a first end coupled to the barrier and a second end pivotally coupled to the carriage frame. The pivotal arm has selectively a tilted forward position and a tilted back position, where the barrier is in the stored position in response to the pivotal arm being in the tilted forward position, and the barrier is in the raised position in response to the pivotal arm being in the tilted back position.

In some examples, a catch has selectively a holding position and a release position, the catch to engage at least one of the barrier and the track follower when the catch is in the holding position, the catch being disengaged from both the barrier and the track follower when the catch is in the release position.

In some examples, the catch includes a plurality of teeth.

In some examples, a cam surface is on the carriage frame. A roller is connected to the barrier. The roller is to engage the cam surface at an upper point when the barrier is at the raised position, and the roller is to engage the cam surface at a lower point when the barrier is lower than the raised position In some examples, a cam surface is on the barrier, and a roller is on the carriage frame, where the roller is in rolling engagement with the cam surface at a first point when the barrier is at the lowered position, the roller is in rolling engagement with the cam surface at a second point when the barrier is higher than the lowered position.

In some examples, the roller is one of a plurality of rollers, and the cam surface of the barrier engages the plurality of rollers when the barrier is in the raised position.

In some examples, a spring is connected to the carriage frame, the spring to urge the carriage frame in an upward direction.

In some examples, a vehicle restraint includes a main track to mount at a fixed position relative to the loading dock and a carriage frame movable vertically along the main track. A secondary track is borne by the carriage frame. The secondary track is a slot defined by the carriage frame. The secondary track is horizontally elongate between a forward end and a rear end. The main track being closer to the rear end than to the forward end. A barrier has a front end and a back end. The barrier has selectively an extended position and a retracted position relative to the carriage frame. The barrier also has selectively a raised position and a lowered position relative to the carriage frame. The front end of the barrier is higher at the raised position than at the lowered position for a given elevation of the carriage frame. A track follower connected to the barrier at a pivot point. The track follower is to move along the secondary track between the forward end and the rear end. The pivot point is at a substantially fixed location relative to the barrier. The main track being closer to the pivot point when the barrier is at the extended position than when the barrier is at the retracted position. A linear actuator is coupled to the track follower. The barrier moves between the extended position and the retracted position in response to a change in length of the linear actuator.

In some examples, a vehicle restraint includes a main track to mount at a fixed position relative to the loading dock and a carriage frame movable vertically along the main track. A secondary track is borne by the carriage frame. The secondary track is a slot defined by the carriage frame. The secondary track is horizontally elongate between a forward point and a rear point. The main track is closer to the rear point than to the forward point. A barrier has a front end and a back end, the barrier having selectively an extended position and a retracted position relative to the carriage frame. The barrier also has selectively a raised position and a lowered position relative to the carriage frame. The front end being higher at the raised position than at the lowered position for a given elevation of the carriage frame. A track follower is connected to the barrier at a pivot point. The track follower is configured to travel along the secondary track between the forward point and the rear point. The pivot point is at a substantially fixed location relative to the barrier. The main track is closer to the pivot point when the barrier is at the extended position than when the barrier is at the retracted position. A catch is movable relative to the carriage frame. The catch has selectively a holding position and a release position. The catch to engage at least one of the barrier or the track follower when the catch is in the holding position and the catch to disengage the barrier and the track follower when the catch is in the release position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A vehicle restraint to block and release a vehicle at a loading dock, the vehicle restraint comprising:
   a carriage frame to move relative to a main track, the carriage frame including a secondary track defining a front end and a rear end;

a track follower movably coupled to the carriage frame via the secondary track, the track follower movable between the front end and the rear end of the secondary track; and a barrier coupled to the track follower, the barrier to rotate relative to the carriage frame between a raised position and a stored position in response to the track follower moving along a first portion of the secondary track, and the barrier to translate relative to the carriage frame between the raised position and a capturing position in a direction toward the main track to restrain a rear impact guard of the vehicle in response to the track follower moving along a second portion of the secondary track different than the first portion.

2. The vehicle restraint of claim 1, wherein the pivot point is at a substantially fixed location relative to the barrier, and the main track is closer to the pivot point when the barrier is at the raised position than when the barrier is at the stored position.

3. The vehicle restraint of claim 1, wherein the secondary track is substantially linear.

4. The vehicle restraint of claim 1, wherein the secondary track is curved.

5. The vehicle restraint of claim 1, wherein the secondary track includes a substantially linear section and a curved section.

6. The vehicle restraint of claim 1, wherein the secondary track is a slot defined by the carriage frame.

7. The vehicle restraint of claim 1, including a drive coupled to the track follower, the barrier configured to move between the raised position and the stored position via the drive.

8. The vehicle restraint of claim 7, wherein the drive includes a linear actuator, the barrier to move between the raised position and the stored position in response to a change in length of the linear actuator.

9. The vehicle restraint of claim 8, wherein the linear actuator includes at least one of an electric motor or a hydraulic cylinder.

10. The vehicle restraint of claim 7, wherein the drive includes a chain and a sprocket.

11. The vehicle restraint of claim 10, wherein the chain-and-sprocket assembly includes a motor drive sprocket, an idler sprocket and a roller chain, the roller chain coupled to the motor drive sprocket and the idler sprocket.

12. The vehicle restraint of claim 11, wherein opposing ends of the roller chain are to couple to respective ends of the track follower, the roller chain is to move the track follower relative to the carriage frame in the forward direction and the rearward direction via the motor driven sprocket and the idler sprocket.

13. The vehicle restraint of claim 7, wherein the drive includes a pinion gear to engage a toothed rack.

14. The vehicle restraint of claim 7, wherein the drive includes a plurality of pinion gears enmeshed with a toothed rack.

15. The vehicle restraint of claim 1, further including a pivotal arm having a first end coupled to the barrier and a second end pivotally coupled to the carriage frame.

16. The vehicle restraint of claim 1, further including a catch movable between a holding position and a release position, the catch to engage at least one of the barrier and the track follower when the catch is in the holding position, the catch to disengage from the barrier and the track follower when the catch is in the release position.

17. The vehicle restraint of claim 16, wherein the catch includes a plurality of teeth.

18. The vehicle restraint of claim 1, further including:
a cam surface on the carriage frame; and
a roller connected to the barrier, the roller to engage the cam surface at an upper point when the barrier is at the raised position, the roller to engage the cam surface at a lower point when the barrier is lower than the raised position.

19. The vehicle restraint of claim 1, further including:
a cam surface on the barrier; and
a roller on the carriage frame, the roller structured to be in rolling engagement with the cam surface at a first point when the barrier is at the lowered position, the roller structured to be in rolling engagement with the cam surface at a second point when the barrier is higher than the lowered position.

20. The vehicle restraint of claim 19, wherein the roller is one of a plurality of rollers, and the cam surface of the barrier is structured to engage the plurality of rollers when the barrier is in the raised position.

21. A vehicle restraint to block and release a vehicle at a loading dock, the vehicle restraint comprising:
a carriage frame to move relative to a main track, the carriage frame including a secondary track defining a front end and a rear end;
a track follower movably coupled to the carriage frame via the secondary track, the track follower movable between the front end and the rear end of the secondary track, the track follower includes a front roller and a rear roller in guided relationship with the secondary track; and
a barrier pivotally coupled to the track follower at a pivot point, the barrier to rotate relative to the carriage frame between a raised position and a stored position, and the barrier to translate relative to the carriage frame between the front end and the rear end of the secondary track, the barrier to rotate from the stored position to the raised position and the barrier to translate toward the rear end of the secondary track to a capturing position to restrain a rear impact guard of the vehicle.

22. The vehicle restraint of claim 21, wherein the front roller and the rear roller are substantially equal in elevation regardless of whether the barrier is in the raised position or the stored position.

23. The vehicle restraint of claim 21, wherein the front roller is at a higher elevation when the barrier is in the raised position than when the barrier is in the stored position, and the rear roller is at a substantially constant elevation when the barrier is in the raised position and the stored position.

24. A vehicle restraint to block and release a vehicle at a loading dock, the vehicle restraint comprising:
a main track to mount to the loading dock;
a carriage frame movable relative to the main track, the carriage frame including a secondary track having a forward end and a rear end;
a barrier structured to move between an extended position and a retracted position relative to the carriage frame, and the barrier structured to move between a raised position and a lowered position relative to the carriage frame;
a track follower connected to the barrier at a pivot point, the track follower to move relative to the secondary track between the forward end and the rear end; and
a drive coupled to the track follower between the first end and the second end of the secondary track, the track follower to cause the barrier to move between the extended position and the retracted position in response to the drive moving the track follower along a first portion of the secondary track and move the barrier between the raised position and the lowered position in response to drive moving the track follower along a second portion of the secondary track.

25. The vehicle restraint of claim 24, further including a catch movable relative to the carriage frame between a holding position and a release position, the catch to engage at least one of the barrier or the track follower when the catch is in the holding position, the catch to disengage the barrier and the track follower when the catch is in the release position.

\* \* \* \* \*